(12) United States Patent
Salzinger et al.

(10) Patent No.: US 11,512,826 B2
(45) Date of Patent: *Nov. 29, 2022

(54) PORTABLE SOLAR-POWERED DEVICES

(71) Applicant: MPOWERD Inc., New York, NY (US)

(72) Inventors: John Salzinger, Brooklyn, NY (US);
Michael Muehlemann, Elbridge, NY (US)

(73) Assignee: MPOWERD Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/002,620

(22) Filed: Jan. 21, 2016

(65) Prior Publication Data

US 2016/0215941 A1 Jul. 28, 2016

Related U.S. Application Data

(63) Continuation of application No. 14/731,660, filed on Jun. 5, 2015, now Pat. No. 9,255,675, which is a (Continued)

(51) Int. Cl.
*F21L 4/08* (2006.01)
*F21S 9/03* (2006.01)
(Continued)

(52) U.S. Cl.
CPC ............... *F21S 9/037* (2013.01); *F21L 4/08* (2013.01); *F21V 3/026* (2013.01); *F21V 15/012* (2013.01);
(Continued)

(58) Field of Classification Search
CPC .. F21L 4/08; F21S 9/037; F21V 3/026; F21V 15/012; F21V 21/406; F21V 23/009;
(Continued)

(56) References Cited

U.S. PATENT DOCUMENTS 5,782,552 A 7/1998 Green
5,888,156 A 3/1999 Cmiel
(Continued)

FOREIGN PATENT DOCUMENTS

CA 152065 5/2014
CN 1162496 A 10/1997
(Continued)

OTHER PUBLICATIONS

"Luci® aura, MPOWERED's Color Changing Solar Lantern Joins inflatable Luci® Center Stage at ShowStoppers@CES 2014," Jan. 7, 2014, available at https://www.prnewswire.com/news-releases/luci-aura-mpowerds-color-changing-solar-lantern-joins-inflatable-luci-center-stage-at-showstoppers-ces-2014-239076741.html.*
(Continued)

*Primary Examiner* — Rajarshi Chakraborty
*Assistant Examiner* — Nathaniel J Lee
(74) *Attorney, Agent, or Firm* — Pearl Cohen Zedek Latzer Baratz LLP

(57) ABSTRACT

Solar-powered lighting devices that may be portable and/or collapsible are described. The devices may include a housing including a first wall, a second wall, and one or more side walls between the first wall and the second wall, at least one solar panel to generate solar energy, and a rechargeable battery to store the solar energy generated. The devices may include a plurality of operating modes for controlling lights within the housing, and a microprocessor for controlling the operating modes.

24 Claims, 15 Drawing Sheets

Related U.S. Application Data continuation of application No. 14/619,307, filed on Feb. 11, 2015, now Pat. No. 9,080,736.

(60) Provisional application No. 62/106,553, filed on Jan. 22, 2015.

(51) Int. Cl.

| | | |
|---|---|---|
| F21V 15/01 | (2006.01) | |
| F21V 23/04 | (2006.01) | |
| F21V 3/02 | (2006.01) | |
| H05B 45/00 | (2022.01) | |
| H05B 45/10 | (2020.01) | |
| H05B 45/20 | (2020.01) | |
| H05B 47/11 | (2020.01) | |
| H05B 47/12 | (2020.01) | |
| H05B 47/19 | (2020.01) | |
| H05B 47/105 | (2020.01) | |
| F21V 21/40 | (2006.01) | |
| F21V 23/00 | (2015.01) | |
| F21V 31/00 | (2006.01) | |
| H05B 37/02 | (2006.01) | |
| F21Y 115/10 | (2016.01) | |
| F21Y 113/13 | (2016.01) | |
| F21W 107/00 | (2018.01) | |

(52) U.S. Cl.
CPC .......... *F21V 21/406* (2013.01); *F21V 23/009* (2013.01); *F21V 23/0414* (2013.01); *F21V 31/00* (2013.01); *H05B 45/00* (2020.01); *H05B 45/10* (2020.01); *H05B 45/20* (2020.01); *H05B 47/105* (2020.01); *H05B 47/11* (2020.01); *H05B 47/12* (2020.01); *H05B 47/19* (2020.01); *F21V 21/40* (2013.01); *F21V 23/04* (2013.01); *F21W 2107/00* (2018.01); *F21Y 2113/13* (2016.08); *F21Y 2115/10* (2016.08)

(58) Field of Classification Search
CPC . F21V 23/0414; F21V 31/00; H05B 33/0803; H05B 33/0809; H05B 33/0845; H05B 33/0854; H05B 33/0857; H05B 33/0872; H05B 37/0218; H05B 37/0227; H05B 37/0236; H05B 37/0272
See application file for complete search history.

(56) References Cited

U.S. PATENT DOCUMENTS

| | | | |
|---|---|---|---|
| 5,947,581 A | 9/1999 | Schrimmer et al. | |
| 6,013,985 A * | 1/2000 | Green | H05B 47/195 315/159 |
| 6,193,392 B1 | 2/2001 | Lodhie | |
| 6,897,832 B2 | 5/2005 | Essig, Jr. et al. | |
| 7,073,462 B1 | 7/2006 | Layman et al. | |
| 7,377,667 B2 | 5/2008 | Richmond | |
| 7,377,677 B2 | 5/2008 | Kang et al. | |
| 7,497,583 B2 | 3/2009 | Ma | |
| 7,513,638 B2 | 4/2009 | Allsop et al. | |
| 7,690,812 B2 | 4/2010 | Roberts | |
| 7,753,576 B2 | 7/2010 | Marcinkewicz et al. | |
| 7,825,325 B2 | 11/2010 | Kennedy et al. | |
| 7,857,490 B1 | 12/2010 | Fett | |
| 8,025,510 B2 * | 9/2011 | Bolshakov | H01R 13/443 439/136 |
| 8,410,748 B2 | 4/2013 | Wilson | |
| 8,674,211 B1 | 3/2014 | Palmer et al. | |
| 8,823,315 B2 | 9/2014 | Oppizzi | |
| 8,845,126 B1 | 9/2014 | Martzall | |
| 9,016,886 B2 | 4/2015 | Snyder | |
| 9,080,736 B1 | 7/2015 | Salzinger et al. | |
| 9,194,563 B2 | 11/2015 | Synder | |
| 9,200,767 B2 | 12/2015 | Katsaros | |
| 9,200,770 B2 | 12/2015 | Chun | |
| 9,206,952 B2 | 12/2015 | Gold et al. | |
| 9,255,675 B1 * | 2/2016 | Salzinger | H05B 47/12 |
| 9,347,629 B2 | 5/2016 | Stork et al. | |
| 9,638,399 B2 | 5/2017 | Synder | |
| 10,180,221 B1 | 1/2019 | Jeong et al. | |
| 2003/0207601 A1 * | 11/2003 | Adachi | H01R 13/443 439/135 |
| 2004/0130888 A1 * | 7/2004 | Twardawski | F21V 23/0414 362/184 |
| 2005/0002188 A1 | 1/2005 | Bucher et al. | |
| 2005/0265029 A1 | 12/2005 | Epstein et al. | |
| 2006/0022635 A1 * | 2/2006 | Li | H02J 7/02 320/107 |
| 2006/0108612 A1 | 5/2006 | Richmond | |
| 2006/0291217 A1 | 12/2006 | Vanderschuit | |
| 2007/0014125 A1 | 1/2007 | Chu | |
| 2007/0091594 A1 | 4/2007 | Soon | |
| 2008/0013317 A1 | 1/2008 | Hinds | |
| 2008/0175006 A1 | 7/2008 | Kellmann et al. | |
| 2008/0225553 A1 | 9/2008 | Roberts et al. | |
| 2009/0251892 A1 | 10/2009 | Hatti et al. | |
| 2010/0110668 A1 | 5/2010 | Marlonia | |
| 2010/0214774 A1 | 8/2010 | Liu et al. | |
| 2011/0018439 A1 | 1/2011 | Fabbri | |
| 2011/0133655 A1 * | 6/2011 | Recker | H05B 47/13 315/159 |
| 2011/0216529 A1 * | 9/2011 | Weng | B62J 1/00 362/183 |
| 2012/0042996 A1 | 2/2012 | Glynn | |
| 2012/0120642 A1 | 5/2012 | Sreshta et al. | |
| 2012/0152306 A1 | 6/2012 | Iqbal et al. | |
| 2012/0193660 A1 | 8/2012 | Donofrio | |
| 2012/0224359 A1 * | 9/2012 | Chun | F21V 3/049 362/183 |
| 2012/0242247 A1 | 9/2012 | Hartmann et al. | |
| 2012/0300444 A1 * | 11/2012 | Gibson | F21L 15/14 362/186 |
| 2013/0201668 A1 | 8/2013 | Chien | |
| 2013/0335953 A1 * | 12/2013 | Gold | C02F 1/76 362/190 |
| 2014/0049942 A1 | 2/2014 | Chilton et al. | |
| 2014/0118997 A1 * | 5/2014 | Snyder | F21S 9/037 362/183 |
| 2014/0146525 A1 | 5/2014 | Lueptow | |
| 2015/0036325 A1 | 2/2015 | Cohen | |
| 2015/0219294 A1 | 8/2015 | Sreshta et al. | |
| 2015/0338033 A1 | 11/2015 | Lin et al. | |
| 2016/0025287 A1 | 1/2016 | Philhower et al. | |
| 2016/0040836 A1 | 2/2016 | Sreshta et al. | |
| 2016/0109077 A1 | 4/2016 | Chun | |
| 2016/0154171 A1 | 6/2016 | Kato et al. | |
| 2016/0341380 A1 | 11/2016 | Stork et al. | |
| 2017/0234493 A1 | 8/2017 | Stork et al. | |
| 2017/0276303 A1 | 9/2017 | Chen | |
| 2018/0048949 A1 | 2/2018 | Chen | |
| 2018/0128438 A1 | 5/2018 | Sreshta et al. | |

FOREIGN PATENT DOCUMENTS

| | | |
|---|---|---|
| CN | 101576204 A | 11/2009 |
| CN | 101690402 A | 3/2010 |
| CN | 201582579 U | 9/2010 |
| CN | 101886746 A | 11/2010 |
| CN | 201010228234.3 | 11/2010 |
| CN | 201706338 U | 1/2011 |
| CN | 201715273 U | 1/2011 |
| CN | 102116415 A | 7/2011 |
| CN | 202048488 U | 11/2011 |
| CN | 202109228 U | 1/2012 |
| CN | 102379502 A | 3/2012 |
| CN | 102403929 A | 4/2012 |
| CN | 202203682 U | 4/2012 |
| CN | 102592522 A | 7/2012 |
| CN | 102668697 A | 9/2012 |

(56) References Cited

FOREIGN PATENT DOCUMENTS

| CN | 202469530 U | 10/2012 |
|---|---|---|
| CN | 202511013 U | 10/2012 |
| CN | 202581071 U | 12/2012 |
| CN | 202884514 U | 4/2013 |
| CN | 202884514 U | 4/2013 |
| CN | 203215307 U | 9/2013 |
| CN | 203449018 U | 3/2014 |
| CN | 302782955 S | 3/2014 |
| CN | 204201750 U | 3/2015 |
| CN | 204420848 U | 6/2015 |
| CN | 205624968 U | 10/2016 |
| CN | 205640672 U | 10/2016 |
| CN | 206042307 U | 3/2017 |
| DE | 102006022185 | 11/2007 |
| EP | 002289363-0001 | 8/2013 |
| KR | 101061738 B1 | 6/2011 |
| WO | WO 95/33624 A1 | 12/1995 |
| WO | WO 2004/071935 A2 | 8/2004 |

OTHER PUBLICATIONS

Mpowered, "Technical Specifications: Luci & Luci Aura" Apr. 3 (Year: 2014).*

Luci Aura, MPOWERED's Color Changing Solar Lantern Joins Inflatable Luci Center Stage at ShowStoppers@CES 2014, Jan. 7 (Year: 2014).*

International Search Report for International Application No. PCT/US2016/014222, dated Apr. 8, 2016 (2 pages).

Goering, L., "Blow-up Solar Lantern Lights up Haiti's Prospects," Thomson Reuters Foundation, Jun. 22, 2012 (4 pages), available at http://www.trust.org/item/20120622150100-k9yos.

Patent Evaluation Report for Chinese Application No. ZL201320570977.8, dated Feb. 26, 2014 (87 pages).

Jonsson, J. Project Soul Cell, YouTube, Oct. 28, 2009 (1 page), available at http://www.youtube.com/watch?v=DG7lkgUUr4M.

European Search Report dated Sep. 23, 2015, European Application No. 13851862.6, pp. 1-5.

Ashan et al. "Solar Powered Lantern for Flood Affected Areas," *Power Engineering Society Winter Meeting*, 2000, pp. 487-492.

Girlmeetsgeek, "Luci Aura :. MPOWERD's Solar Lantern Gives Back and Means It," Jan. 24, 2014, available at http://www.girlmeetsgeek.com/2014/01/24/luci-aura-mpowerds-solar-lantern-means/.

Lemke, E., "Inflatable Lantern Provides Big Light," Feb. 20, 2015, available at https://gearjunkie.com/luminaid-packlite-lantern.

Liszewski, A., "The Luci Inflatable Solar Lantern Gets a Colorful Follow-up," Jan. 8, 2014, available at https://gizmodo.com/the-luci-inflatable-solar-lantern-gets-a-colorful-follo-1496922502.

"Luci® Aura, MPOWERD's Color Changing Solar Lantern Joins Infatable Luci® Center Stage at ShowStoppers @ CES 2014," Jan. 7, 2014, available at https://www.prnewswire.com/news-releases/luci-aura-mpowerds-color-changing-solar-lantern-joins-inflatable-luci-center-stage-at-showstoppers-ces-2014-239076741.html.

MPOWERD™ Good Energy™ presentation, Apr. 2, 2014 (23 pages).

MPOWERD, "Technical Specifications: Luci & Luci Aura," Apr. 3, 2014 (1 page).

MPOWERD 2015 Winter Catalog, "MPOWERD™ Anytime. Anywhere. Any weather™," Jan. 15, 2015 (32 pages).

U.S. Appl. No. 16/165,864, filed Oct. 19, 2018.

* cited by examiner

PORTABLE SOLAR-POWERED DEVICES

CROSS-REFERENCE TO RELATED APPLICATIONS

This application is a continuation of U.S. application Ser. No. 14/731,660, filed on Jun. 5, 2015, now U.S. Pat. No. 9,255,675, which is a continuation of U.S. application Ser. No. 14/619,307, filed on Feb. 11, 2015, now U.S. Pat. No. 9,080,736, which claims priority to U.S. Provisional Application No. 62/106,553, filed on Jan. 22, 2015, all of which are incorporated herein by reference in their entireties.

TECHNICAL FIELD

The present disclosure generally relates to solar-powered lighting devices. More particularly, embodiments of the present disclosure include portable, rechargeable lighting devices, such as lanterns powered by solar energy.

BACKGROUND

Certain situations require alternative lighting solutions, such as during limited or interrupted power access, or a lack of power altogether. Examples include cases of natural disaster and other emergencies, remote/rural locations far from a power station or electricity grid, and developing countries that have limited and/or unreliable power. Yet, current lighting options are often short-lived, unreliable, inefficient, non-reusable/non-rechargeable, impractical, and/or expensive to produce and operate.

SUMMARY OF THE DISCLOSURE

A collapsible solar-powered lighting device comprising a housing including a first wall, a second wall opposite the first wall and one or more side walls extending between the first wall and the second wall, wherein the first wall, second wall, and one or more side walls define an inflatable bladder; at least one solar panel integrated into an outside surface of at least one of the first wall and the second wall, thereby defining the at least one of the first wall and the second wall that includes the at least one solar panel as an electronics wall of the housing; a plurality of light-emitting diodes (LEDs) integrated into an inside surface of the electronics wall of the housing, the plurality of LEDs forming a generally annular arrangement and facing an interior of the housing; a rechargeable battery integrated into the electronics wall between the inside surface of the electronics wall and the outside surface of the electronics wall, the rechargeable battery being electrically connected between the at least one solar panel and the plurality of LEDs, such that the rechargeable battery is configured to supply current to the plurality of LEDs and be recharged by the at least one solar panel; a button integrated into one or more of the first wall, the second wall, and the one or more side walls, the button being selectable by a user to control an operating mode of the plurality of LEDs; a microprocessor integrated into the electronics wall of the housing between the inside surface of the electronics wall and the outside surface of the electronics wall, the microprocessor being electrically connected to the button, the rechargeable battery, and the plurality of LEDs; and a current regulator coupled between the rechargeable battery and the microprocessor, the current regulator maintaining a threshold current delivered to the plurality of LEDs as controlled by the microprocessor; wherein the microprocessor is configured to control a plurality of operating modes of the LEDs, at least one of the operating modes including changing, a color of light emitted from the housing such that a first press of the button causes the plurality of LEDs to emit a first color of light, a second press of the button causes the plurality of LEDs to emit a second color of light, a third press of the button causes the plurality of LEDs to emit a third color of light, and an nth press of the button causes the plurality of LEDs to initiate a transition sequence, the transition sequence causing the plurality of LEDs to begin emitting the first color of light, gradually change to the second color of light, gradually change to the third color of light, and gradually change to the nth color of light.

The present disclosure further includes an inflatable solar-powered lighting device comprising: a housing, including a first wall, a second wall opposite the first wall, and one or more side walls extending between the first wall and the second wall, wherein the first wall, second wall, and one or more side walls define an airtight inflatable bladder; at least one solar panel integrated into an outside surface of at least one of the first wall and the second wall; a plurality of light-emitting diodes (LEDs) integrated into an inside surface of the at least one of the first wall and the second wall, the plurality of LEDs arranged in a generally annular arrangement and facing an interior of the airtight inflatable bladder defined by the first wall, second wall, and one or more side walls; a rechargeable battery integrated into the t least one of the first wall and the second wall between the inside surface of the at least one of the first wall and the second wall and the outside surface of the at least one of the first wall and the second wall, the rechargeable battery being electrically connected between the at least one solar panel and the plurality of LEDs, such that the rechargeable battery is configured to supply current to the plurality of LEDs and be recharged by the at least one solar panel; a button integrated into one or more of the first wall, the second wall, and the one or more side walls, the button being selectable by a user to control an operating mode of the plurality of LEDs; a microprocessor integrated into the at least one of the first wall and the second wall between the inside surface of the at least one of the first wall and the second wall and the outside surface of the at least one of the first wall and the second wall, the microprocessor being electrically connected between the button, the battery, and the plurality of LEDs; and a current regulator coupled between the rechargeable battery and the microprocessor, the current regulator maintaining a threshold current delivered to the plurality of LEDs as controlled by the microprocessor; wherein the microprocessor is configured to control a plurality of operating modes of the LEDs, at least one of the operating modes including changing a color of light emitted from the housing.

The present disclosure further includes a collapsible solar-powered lighting device comprising: a housing including a first wall, a second wall opposite the first wall, and one or more side walls extending between the first wall and the second wall, wherein the first wall, second wall, and one or more side walls define an inflatable bladder; at least one solar panel integrated into an outside surface of at least one of the first wall and the second wall, the solar panel defining the at least one of the first wall and the second wall as an electronics wall of the housing; a plurality of light-emitting diodes (LEDs) integrated into an inside surface of the electronics wall of the housing, the plurality of LEDs arranged in a generally annular arrangement and facing an interior of the inflatable bladder defined by the first wall, second wall, and one or more side walls a rechargeable battery integrated into the electronics wall of the housing between the inside surface of the electronics wall and the outside surface of the electronics wall, the rechargeable battery being electrically connected between the at least one solar panel and the plurality of LEDs, such that the rechargeable battery is configured to supply current to the plurality of LEDs and be recharged by the at least one solar panel; a button integrated into one or more of the first wall, the second wall, and the one or more side walls, the button being selectable by a user to control an operating mode of the plurality of LEDs; and a microprocessor integrated into the electronics wall of the housing between the inside surface of the electronics wall and the outside surface of the electronics wall, the microprocessor being electrically connected between the button, the battery, and the plurality of LEDs; wherein the microprocessor is configured to control a plurality of operating modes of the LEDs, at least one of the operating modes including changing a color of light emitted from the housing such that a first press of the button causes the plurality of LEDs to emit a first color of light, a second press of the button causes the plurality of LEDs to emit a second color of light, and a third press of the button causes the plurality of LEDs to emit a third color of light.

BRIEF DESCRIPTION OF THE FIGURES

The accompanying drawings, which are incorporated in and constitute a part of this specification, illustrate various exemplary embodiments and together with the description, serve to explain the principles of the disclosed embodiments.

FIGS. 1A-1D show an exemplary device, in accordance with one or more embodiments of the present disclosure, wherein FIG. 1C shows an exploded view of the device of FIG. 1A. and FIG. 1D shows an exemplary design on the device of FIG. 1A.

FIGS. 3A-3C show an exemplary device, in accordance with one or more embodiments of the present disclosure, wherein FIG. 3C shows an exploded view of the device of FIG. 3A.

DETAILED DESCRIPTION

Embodiments of the present disclosure include solar-powered lighting devices that may be portable and/or collapsible.

Figure 1A:
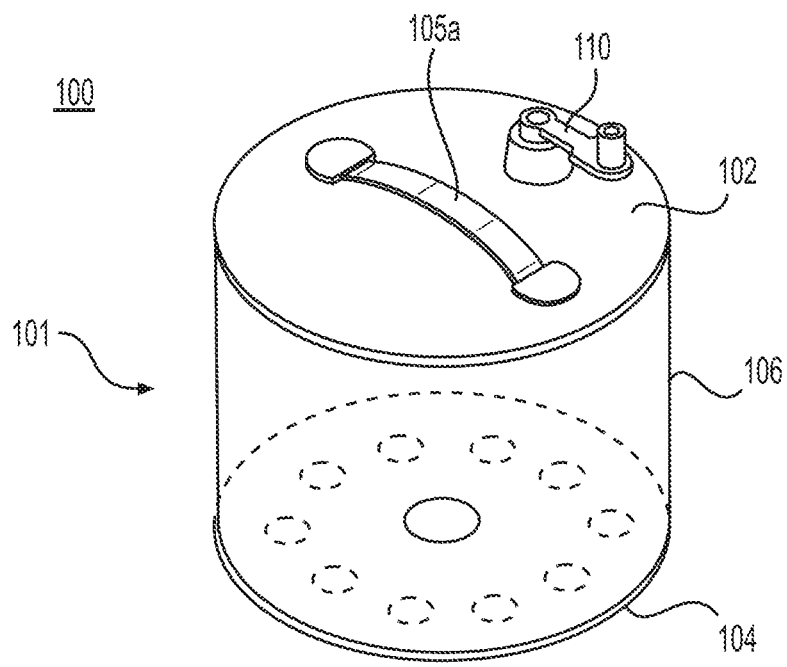
Figure 1B:
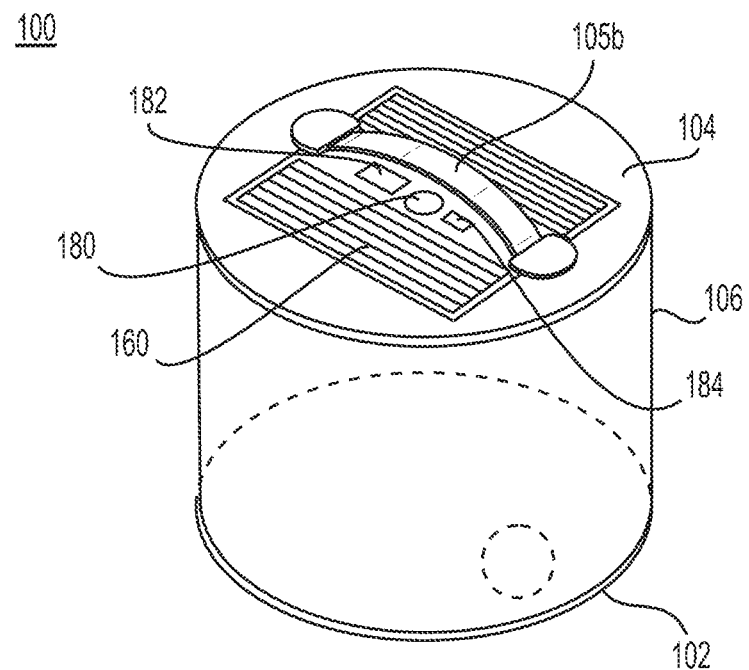
Figure 1C:
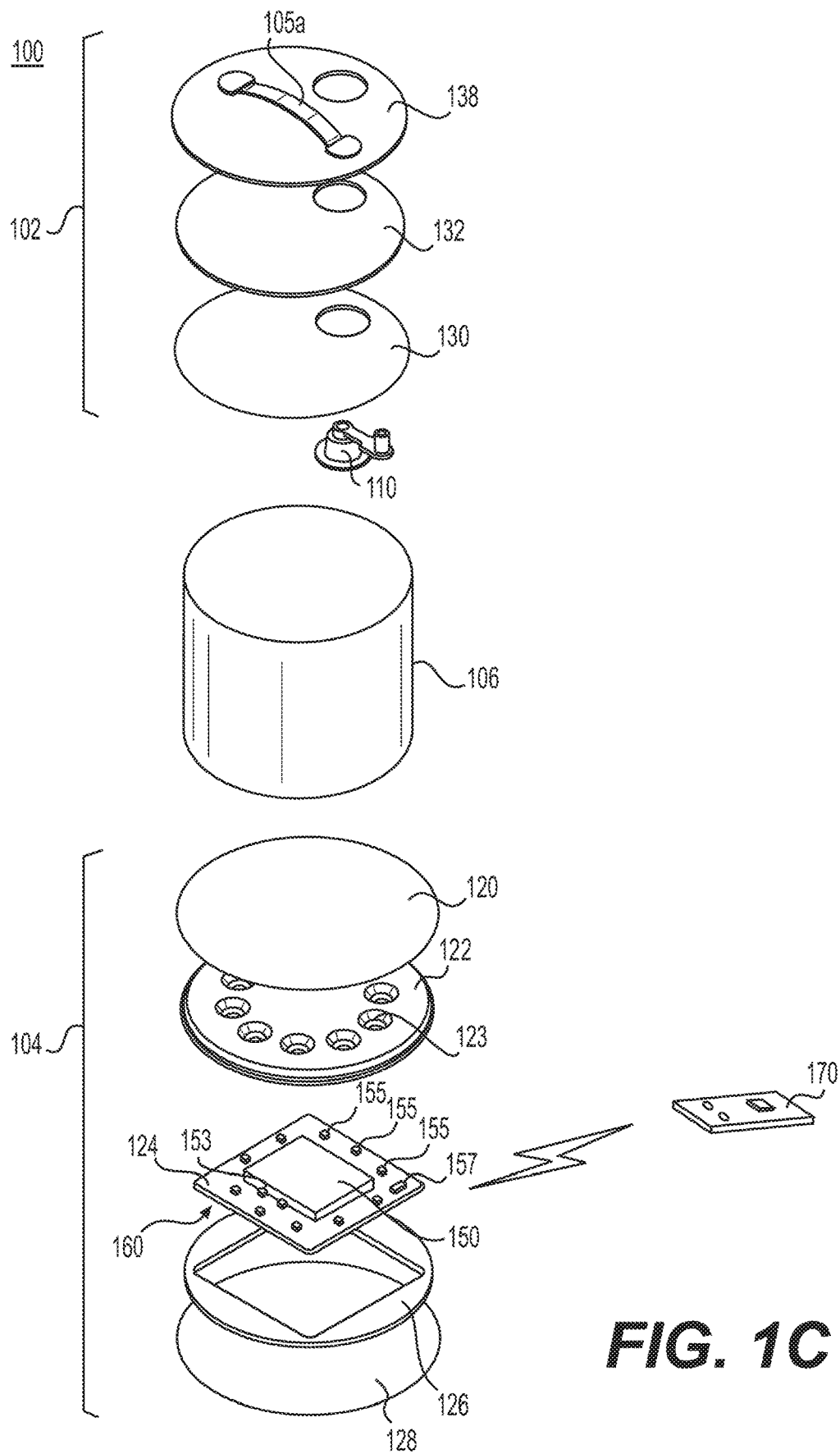

FIGS. 1A-1C illustrate an exemplary lighting device 100 comprising an inflatable housing 101, such that the device 100 may have a collapsed configuration (e.g., for storage, recharging, or otherwise when not in use) and an expanded, inflated configuration (e.g., for use). The housing 101 may include a first wall 102, a second wall 104, and one or more side walls 106 between the first wall 102 and the second wall 104, wherein the side wall(s) 106 may be collapsible, e.g., to allow the device 100 to deflate and inflate. For example, the first wall 102, second wall 104, and one or more side walls 106 may define an inflatable bladder. The first wall 102 and the second wall 104 may be positioned opposite each other, e.g., generally parallel, or any other suitable configuration. The devices of the present disclosure are not limited to any particular orientation for storage and/or while in use. For example, any of the first wall 102, the second wall 104, or the side wall(s) 106 of device 100 may have an upward-facing orientation during use. Further, the orientation of the device 100 may be changed during use.

In some embodiments, the device 100, e.g., the housing 101 of the device 100, may be airtight and/or watertight. For example, the device 100 may be airtight and/or watertight in accordance with various industrial standards or codes.

The housing 101 may have a generally cylindrical shape, as shown in FIG. 1A (top view) and FIG. 1B (bottom view), comprising one generally cylindrical side wall 106. For example, the first and second walls 102, 104 may be planar, and may have one generally cylindrical side wall 106 therebetween. For example, the first and/or second walls 102, 104 ma be circular (as shown in FIGS. 1A and 1B), oval, or polygonal in shape (e.g., square, rectangular, triangular, hexagonal, octagonal, etc.). The first and second walls 102, 104 may have the same size, or may have different sizes. For example, the first wall 102 may be larger than the second wall 104, such that the housing 101 is tapered and wider towards the first end, or the second wall 104 may be larger than the first wall 102, such that the housing 101 is tapered and wider towards the second end. In some embodiments, at least a portion of the first wall 102 and/or the second wall 104 may be foldable. For example, the first wall 102 and/or the second wall 104 may be configured to fold, e.g., to achieve a smaller cross-sectional area or volume in the collapsed configuration.

The side wall(s) 106 may correspond to the shape of the first and/or second walls 102, 104. For example, the housing 101 may include polygonal first and second walls 102, 104, and a plurality of side walls 106 corresponding in number to the number of sides of the polygon. In some embodiments, the first and/or second walls 102, 104 may be three-dimensional, e.g., providing for a housing 101 haying a spherical or polyhedral shape (e.g., cube, pyramid, rectangle, star, etc.). For example, the housing 101 may have a spherical shape and include a soccer ball design or a. beach ball design incorporated into the housing 101. The housing 101 may include any combination of first, wall 102, second wall 104, and side wall(s) 106. For example, the first wall 102 may have a three-dimensional shape, such as a dome, and the second wall 104 may have a planar shape, such as a circle, oval, rectangle, or square, with a generally cylindrical side wall 106 therebetween.

The side wall(s) 106 of the housing 101 may he flexible to allow the housing 101 to expand when inflated and collapse when deflated. Exemplary materials suitable for the side wall(s) 106 include plastics, e.g., polyvinylchloride (PVC), polyethylene (PE), thermoplastic polyurethane (TPU), and other polymers, in a flexible form, such as a sheet. In some embodiments, the housing 101 may be transparent, e.g., comprising a clear plastic material such as PVC or TPU. In some embodiments, at least a portion of the material comprising the housing 101 may be biodegradable, e.g., a biodegradable polymer such as biodegradable TPU. The first and/or second walls 102, 104 may be relatively more rigid than the side wall(s) 106, e.g., comprising cardstock or a relatively rigid plastic material, to provide the device 100 with sufficient stability to be free-standing when expanded. Any of the plastic materials used for the housing 101 may have a shiny or matte finish. In some embodiments, the housing 101 may be configured to produce a three-dimensional image, effect, or appearance.

The device 100 may be configured to emit light with a flashlight or spotlight effect. In some embodiments, the side wall(s) and/or second wall 104 may direct light emitted within the housing 101 towards the first wail 102 to exit the housing. For example, the side wall(s) 106 may include a translucent material providing for a frosted appearance or an opaque material that at least partially reflects light into the housing 101 to exit through the first wall 102. The first wall 102 may comprise a transparent or at least partially transparent material such as clear plastic, to allow the emitted light to pass therethrough.

The second wall 104 may include a solar panel 160, and one or more of a power button 180, a display 182, and a sensor 184. According to some embodiments of the present disclosure, each wall of the device that includes a solar panel may be referred to as an "electronics wall." Thus, the second wall 104 of device 100 may comprise an electronics wall, and may include one or more electronic components and/or electronic connections, e.g., as described below. The second wall 104 may be configured to allow the solar panel 160 to be exposed to natural and/or artificial light for charging/recharging the solar panel 160.

The display 182 may be an LED display, and be configured to communicate information about the device 100. For example, the display 182 may include a power level indicator to indicate the relative (e.g., percentage) and/or absolute amount of power or charge remaining in the device 100. The dimensions of the display 182 may be suitable for displaying images and/or words. The sensor 184 may be configured to detect light, sound, motion, moisture, or any combination thereof. In at least one embodiment, the sensor 184 may be configured to detect environmental conditions such as lighting, sound, motion, and/or moisture conditions, and to adjust a parameter of the device 100 (e.g., power level, on/off, light intensity, and/or operating mode) based on the detected environmental conditions. Power button 180, display 182, and/or sensor 184 may be positioned an where on the second. wall 104 other than as depicted in FIG. 1B, or anywhere on the first wall 102 or the side wall(s) 106.

The device 100 may include a valve 110, e.g., extending through the first wall 102, to allow for the passage of air to inflate and deflate the device 100. Closing, the valve 110 may seal the housing 101 such that the housing 101 is airtight and watertight. In some embodiments, the lowermost portion of the valve 110 may lie against the inner surface of the first wall 102, with the upper portion of the valve 110 extending above the outer surface of the first wall 102 to allow the user to inflate and deflate the housing 101. The valve 110 may be flexible, e.g., comprising PVC or other suitable plastics or polymers. In sonic embodiments, for example, the upper portion of the valve 110 may be movable through an opening in the first wall 102 (or other portion of the housing 101, such as a side wall 106 or the second wall 104) by pressing on the valve 110. Thus, a user may invert at least a portion of the valve 110 to provide for a planar outer surface of the housing 101. The valve 110 may be configured for manual and/or automated inflation. In some embodiments, the valve 110 may be a pinch valve. The size dimensions of the valve 110 and/or its location on the housing 101 may vary according to the size, shape, and configuration of the housing 101.

FIG. 1C shows an exploded view of the device 100, showing components of the first wall 102 and the second wall 104. For example, the second wall 104 may include an inner panel 120 (e.g., a second inner panel 120 for devices that include a first inner panel 130, discussed below), a reflector 122, a printed circuit board (PCB) assembly 124, a frame 126, and an outer panel 128 (e.g., a second outer panel 128 for devices that include a first outer panel 138, discussed below). The PCB assembly 124 may include at least one battery 150, which may be operably connected to the solar panel 160. For example, the battery 150 may be configured to store energy generated by the solar panel 160. In sonic embodiments, the solar panel 160 may be coupled to the surface of the PCB assembly 124 opposite the surface that includes the battery 150. Exemplary batteries 150 suitable for the device 100 include, but are not limited to, lithium-ion batteries such as a lithium-ion polymer, and lithium iron phosphate batteries, The battery 150 may generate a voltage from about 2V to about 5V, such as from about 3V to about 4V, e.g., a voltage of about 3.2V, about 3.5V, or about 3.7V. The battery 150 may have a capacity up to at least 2000 mAh, such as a capacity of about 500 mAh, about 750 mAh, about 1000 mAh, about 1250 mAh, about 1500 mAh, about 1750 mAh, or about 2000 mAh, For example, the capacity of the battery may be sufficient to charge an electronic device such as a mobile phone, for example a smart phone (see discussion of devices 600, 700, 800, 900, 1000, and 1100 below).

In some embodiments, the device 100 may include a power supply, e.g., for use in addition to, or as an alternative to, solar power. For example, the device 100 may include a separate DC power supply. In some embodiments, the device 100 may include a first battery 150 configured to store energy generated by the solar panel 160, and a second battery 150 configured to power the display 182, to monitor the power level of the first battery 150. The device 100 may include surge protection, e.g., to protect against voltage spikes, and/or may include a current regulator, e.g., to maintain a desired output of light. For example, a surge protector and/or current regulator may be coupled to the PCB assembly 124 and in communication with the battery 150. In some embodiments, the device 100 may include a field-effect transistor (FET) to maintain a substantially constant current over time, e.g., as the battery 150 drains of power, to maintain consistent light output from the device 100.

The device 100 may include at least one light 155, such as a light-emitting diode (LED). While FIGS. 1A and 1C show device 100 as including 10 lights 155, any number of lights 155 may be used. For example, the device 100 may include one light 155 (see, FIGS. 12A and 12B discussed below), or a plurality of 2, 3, 4, 5, 6, 7 9, 10, 11, 12, 13, 14, 16, 17, 18, 19, or 20 or more lights 155. In some embodiments, for example, the number of lights 155 of the device 100 may range from about 10 to about 50, such as from about 20 to about 40, or from about 25 to about 35. The lights 155 may be different colors, and may be configured to emit visible light (e.g., red, orange, yellow, green, blue, violet, and/or white light), infrared light, and/or ultraviolet light (e.g., UV-A, UV-B, and/or UV-C). In some embodiments, the lights 155 configured to emit different wavelengths of light, e.g., combinations of visible light LEDs and UV light LEDs, or visible light LEDs and infrared LEDs. The lights 155 may be configured to alternate or cycle between different wavelength of light, such as alternating red, orange, yellow, green, blue, violet, and white light, and may he combined to generate additional hues of light, such as magenta, cyan, and amber.

The light(s) 155 may be coupled to the PCB assembly 124. The lights 155 may have any suitable management on the PCB, e.g., disposed around the battery 150, on opposite sides of the battery 150, adjacent to the battery 150, etc. The lights 155 may be positioned or oriented to emit light generally perpendicular to the PCB assembly 124, or may be positioned or oriented at an incline in order to emit light at a non-perpendicular angle.

The PCB assembly 124 may include a microprocessor 153 configured to control the device 100 in different operating modes and/or a transceiver 157 for transmitting and/or receiving data wirelessly. For example, the microprocessor 153 may be configured to turn the device 100 on or off, dim one or more light(s) 155, and/or turn various lights 155 on or off to achieve a particular color or effect. In some embodiments, the transceiver 157 may receive data from a remote control 170 from the Internet, and/or via Bluetooth technology, and transmit the data to the microprocessor 153 for initiating different operating modes of the device 100. For example, a user may control the operating mode of the device 100 via the remote control 170 and/or with a Bluetooth-enabled device. In some embodiments, multiple devices 100 may be configured to communicate with each other wirelessly, e.g., via Bluetooth technology. For example, a user may use a mobile app of a smart phone or other computing device to selectively control an operating mode of device 100 or one or more devices 100. In one embodiment, each device 100 may be provided with hardware and/or processing devices for implementing Z-wave, X-10, Insteon, Zigbee, C-Bus, EnOcean, KNX, and/or UPB home automation standards, for integrating one or more of devices 100 with a home automation or other smarthome system, and for control using a smartphone, television, touchscreen, voice control, or any other desired user interface. Thus, a user may selectively link together a plurality of devices 100 for integrated control, synchronized powering on, synchronized powering off, synchronized color changes, synchronized flickering, and so on. Moreover, the user may selectively link each device 100 with a smartphone and/or smart home system for controlling an operating mode of the device according to as location of the user, a location of the device relative to a geofence, a location of the device relative to another location, and/or a location of the device relative to another device.

As mentioned above, the solar panel 160 may be disposed opposite the PCB assembly 124. Any suitable solar panel 160 may be used in the device 100. In some embodiments, the solar panel 160 may comprise silicon, e.g., polycrystalline silicon, backed by a support material, such as polycarbonate or other plastic or polymer. Exemplary voltages of the solar panel 160 may generally range from about 4V to about 8V, e.g., about 5V, about 6V, or about 7V, but other voltages are encompassed by the disclosure herein.

The power button 180, display 182, and sensor 184 may be coupled to the PCB assembly 124 on the same side as the solar panel 160, as shown in FIG. 1B. The solar panel 160 may comprise two arrays of solar cells with space therebetween, e.g., for placement of one or more of the power button 180, display 182, and sensor 184. Thus, for example, the solar panel 160, battery 150, microprocessor 153, lights 155, power button 180, display 182, and sensor 184 may be in communication with one another via the PCB assembly 124 for operating and controlling the device 100. The power button 180, display 182, and sensor 184 need not be between arrays of solar cells, however, and may be disposed on other portions of the PCB assembly 124, e.g., adjacent to the solar panel 160.

The frame 126 may be coupled to the PCB assembly 124, and may include a window generally corresponding to the dimensions of the solar panel 160 to allow natural and/or artificial light to reach the solar panel 160 for charging. The frame 126 may include one or more other windows as needed to allow access to the power button 180, display 182, and/or sensor 184. Exemplary materials for the frame 126 include, but are not limited to, paper-based materials such as cardstock, and plastics and other polymers. The second outer panel 128 may comprise clear PVC or other materials that allow light to reach the solar panel 160 for charging. In some embodiments, the second outer panel 128 may overlay at least a portion of the power button 180, display 182, and/or sensor 184, or may include cut-out areas to permit environmental exposure (e.g., allowing, the sensor 184 to detect environmental conditions) and/or to permit uninhibited exposure to the solar panel 160.

The reflector 122 may include one or more openings 123, each opening 123 generally aligned with the one or more lights 155 of the PCB assembly 124. For example, in the device 100 comprising ten lights 155 as shown in FIG. 1C, the reflector 122 may include ten openings 123, one opening 123 generally aligned with each light 155 to allow emitted light to pass through the reflector 122 and into the housing 101. The reflector 122 may be rigid, and may be configured to reflect emitted light from the inner surface of the reflector 122. For example, the reflector 122 may comprise rigid PVC with reflective plating. The second inner panel 120 may comprise clear PVC or other materials that allow emitted light to pass into the housing 101.

The second inner panel 120 may form an airtight and/or watertight seal with the side wall(s) 106 to form an inflatable housing, and/or may form an airtight and/or watertight seal with the reflector 122, e.g., to protect electronic components of the second wall 104 against humidity and/or possible damage.

Further referring to FIG. 1C, the first wall 102 may include an outer panel 138 e.g., a first outer panel 138), a disc 132, and an inner panel 130 (e.g., a first inner panel 130), In some embodiments, the disc 132 may be rigid, comprising a rigid plastic material such as Mylar (polyethylene terephthalate (PET)) or PVC. Similar to the reflector 122, the disc 132 may be configured to reflect emitted light from the inside surface of the disc 132. For example, the disc 132 may comprise a reflective coating or plating. The first inner panel 130 may comprise clear PVC or other materials that allow emitted light to pass therethrough to reach the disc 132 and reflect back into the housing 101. The first inner panel 130 may form an airtight and/or watertight seal with the disc 132. The first outer panel 138 may be flexible or rigid, comprising plastics such as PVC or other polymers, or paper-based materials such as cardstock. in some embodiments, at least a portion of each of the first inner panel 130, disc 132, and first outer panel 138 may comprise clear PVC or similarly transparent or translucent materials to allow light to pass through the first wall 102. In some embodiments, at least a portion of the first wall 102 may be opaque.

FIG. 1C is exemplary, such that the device 100 may include additional or fewer components than shown. For example, in some embodiments, the device 100 may not include one or more of the second inner panel 120, first inner panel 130, or disc 132.

At least a portion of the housing 101 may be transparent or translucent to allow the passage of light therethrough. For example, the first wall 102 and/or the side wall(s) 106, or portions thereof, may be transparent, e.g., comprising a clear plastic material. In some embodiments, the first wall 102 and/or side wall(s) 106 may he at least partially translucent, e.g., such that light emitted inside the housing 101 may diffuse through the first wall 102 and/or side walks) 106. An of the first wall 102, second wall, 104, or side wall(s) 106 may be configured to the affect the quality, hue, intensity, and/or amount of light that passes therethrough. In at least one embodiment, the side wall(s) 106 may be configured to diffuse light to provide for a frosted effect or a warm, diffused glow. The inside surfaces of the housing 101 may be configured to enhance or diminish transmission of light through the housing 101. For example, the inside surfaces one or more of the first wall 102, second wall 104, and side wall(s) 106 may include a reflective coating. Further, for example, portions of the housing 101 may be configured to selectively transmit or block particular wavelengths of light. Any of the first wall 102, second wall 104, or side wall(s) 106 may include different colors and/or patterns to affect the light that passes therethrough.

Figure 1D:
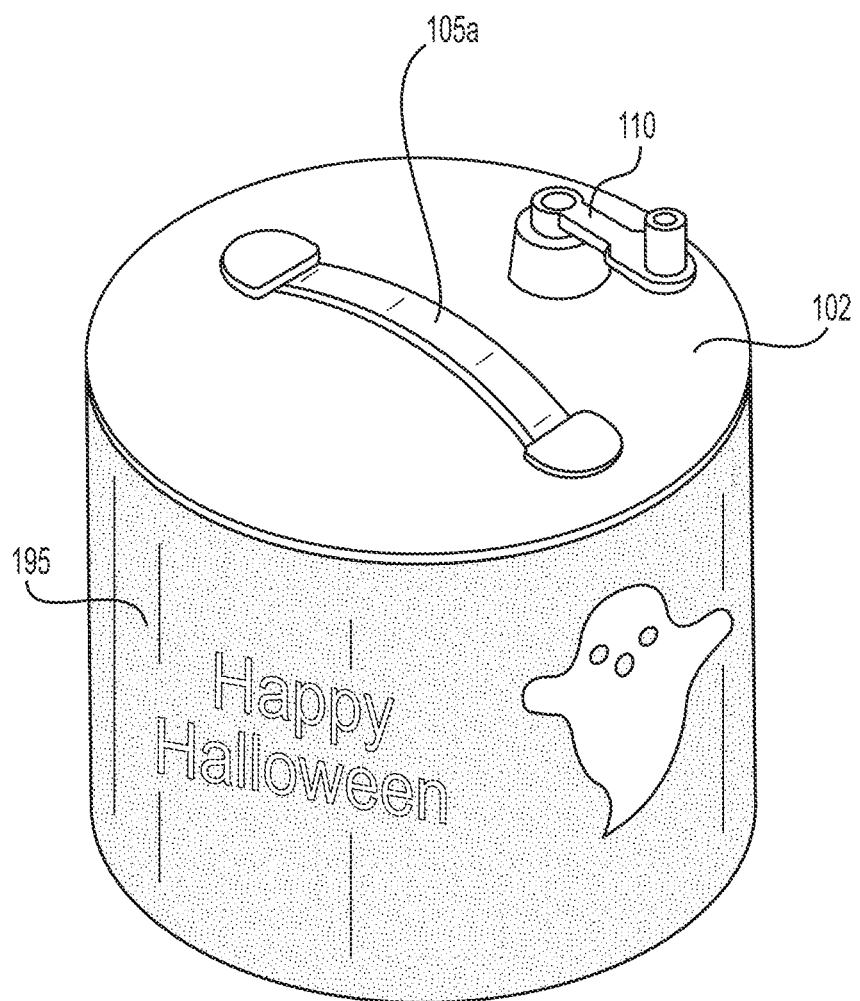

As illustrated in FIG. 1D, the device 100 may include a design 195, e.g., comprising graphics and/or lettering. The design 195 may be incorporated into the inside and/or outside surface(s) of the side wall(s) 106, such as via etching, stenciling, an adhesive, or incorporated into the material of the side wall(s) 106, or may comprise part of a screen or covering configured to fit on or around the device 100. The design 195 may include different colors, textures, and/or or patterns configured to affect the diffusion of light therethrough. The design 195 may be seasonal (e.g., winter, summer, etc.), may relate to holidays (e.g., Halloween, Christmas, Hanukkah, Valentine's Day, etc.), may be associated with an event such as a birthday or anniversary, and/or may incorporate other types of designs, such as stellar constellations.

In some embodiments, the device 100 may include one or more handles 105, e.g., for carrying the device 100, or hanging the device 100 from a wall, ceiling, or other support. Referring to FIGS. 1A and 1B, for example, the device 100 may include a first handle 105a on the outer surface of the first wall 102 (e.g., coupled to the first outer panel 138), and a second handle 105b on an outer surface of the second wall 104 (e.g., coupled to the second outer panel 128). The second handle 105b may be oriented with respect to the solar panel 160 to minimize overlap with the solar panel 160. For example, the width of the second handle 105b may generally overlay the space between arrays of solar cells on the solar panel 160, as shown in FIG. 1B. Other orientations are possible, such as the second handle 105b extending across solar cell arrays (see. FIG. 3B). In some embodiments, the device 100 may include only a first handle 105a, only a second handle 105b, or may not include any handles. The handles 105a, 105b may be flexible, e.g., such that they may lie flat against the housing 101 when not in use. Exemplary materials for the handles 105a, 105b include plastics such as PVC or PE, or other polymers.

The handles 105a, 105b may be fixedly attached to the housing 101 (e.g. via welding or permanent adhesive), or may be at least partially detachable. For example, one or both ends of each handle 105a, 105b may be detachable from the housing 101, e.g., via a snap-fit connection, Velcro, or other suitable removable connection. In some embodiments, the handles 105a, 105b be integral with the housing 101, forming, part of the first wall 102 or the second wall 104.

Figure 2A:
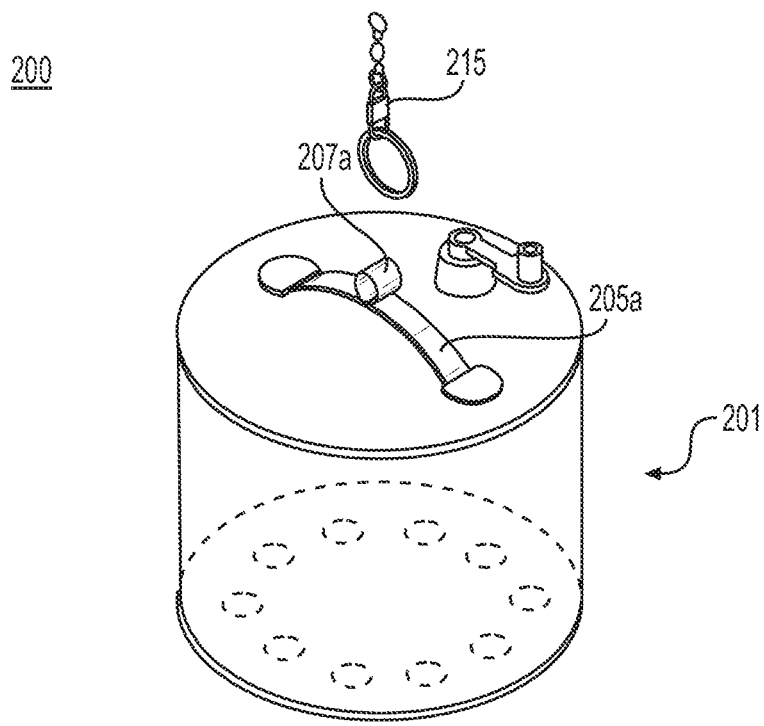
FIGS. 2A and 2B show an exemplary device, in accordance with one or more embodiments of the present disclosure.
Figure 2B:
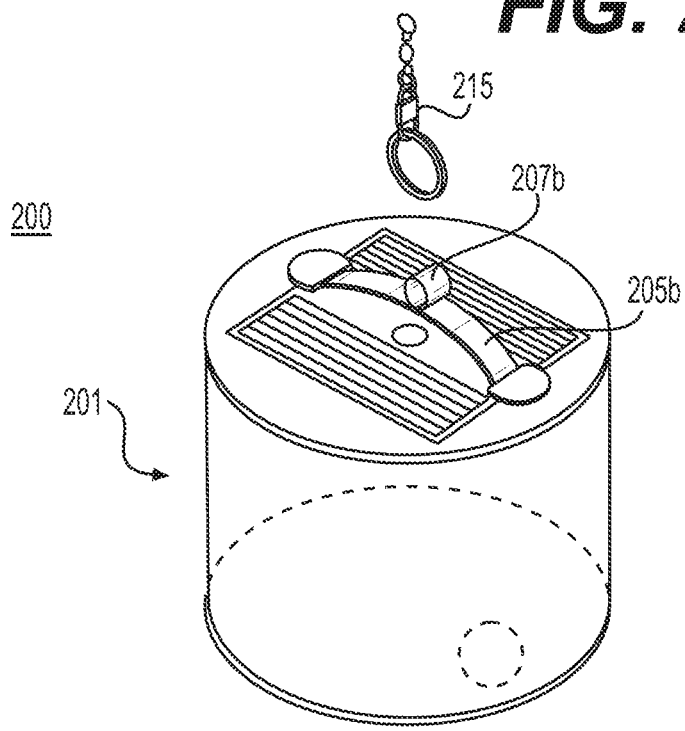

Other types of handles may be used for the devices disclosed herein. FIGS. 2A and 2B illustrate top and bottom views, respectively, of an exemplary device 200 that may include any of the features of device 100 described above. For example, the device 200 may include a housing 201, and first and second handles 205a, 205b coupled to the housing 201. On or both handles 205a, 205b may include a loop 207a, 207b, e.g., to facilitate hanging the device 200 from a support.

In some embodiments, the device 200 may include an adapter assembly 215 corresponding to each handle 205a, 205b, e.g., for clipping the device 200 to a support. For example, the adapter assembly 215 may facilitate transporting the device 200, e.g., by clipping the device 200 to a backpack or bicycle. The adapter assembly 215 may be configured to attach to the loop 207a, 207b via any suitable removable connection, such as a split ring or carabiner. In at least one embodiment, the adapter assembly 215 may comprise a split ring coupled to a barrel swivel (fishing, swivel). The loops 207a, 207b of the handles 205a, 205b may be relatively rigid or reinforced to increase their durability for repeated clipping and unclipping.

Figure 3A:
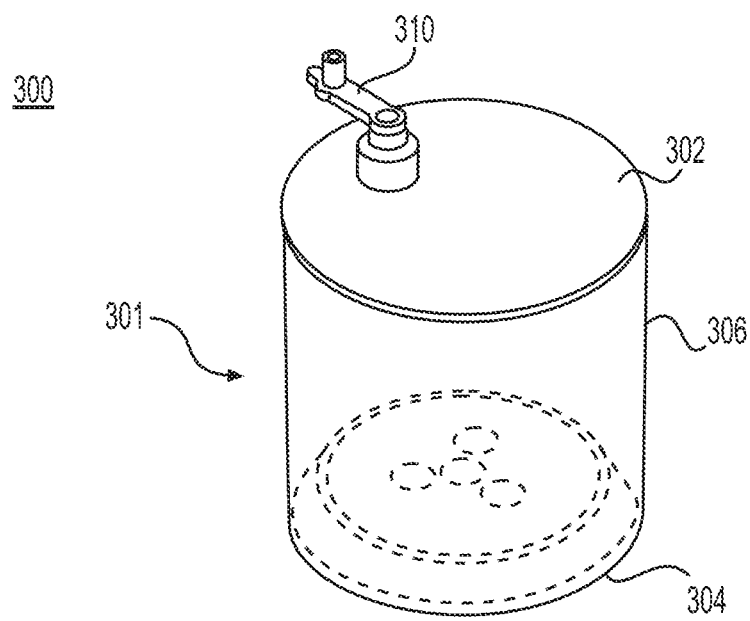
Figure 3B:
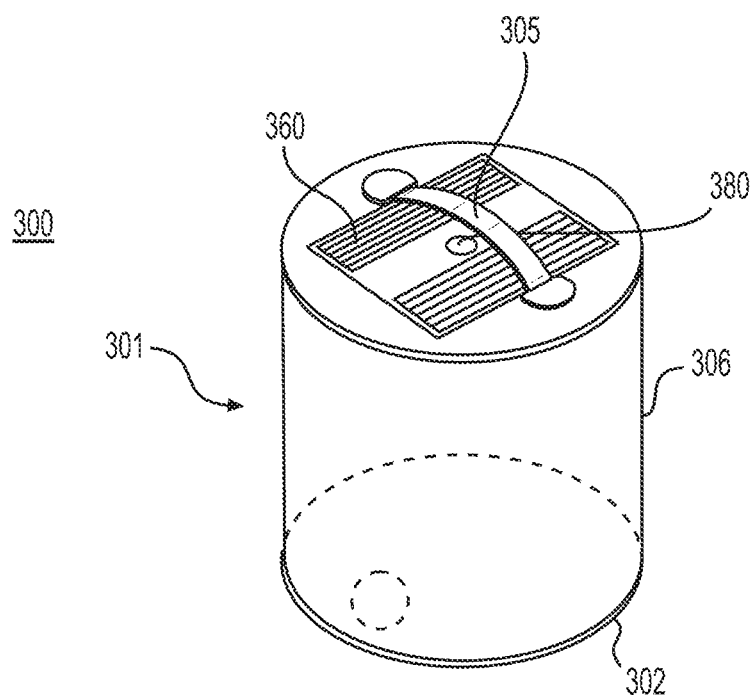
Figure 3C:
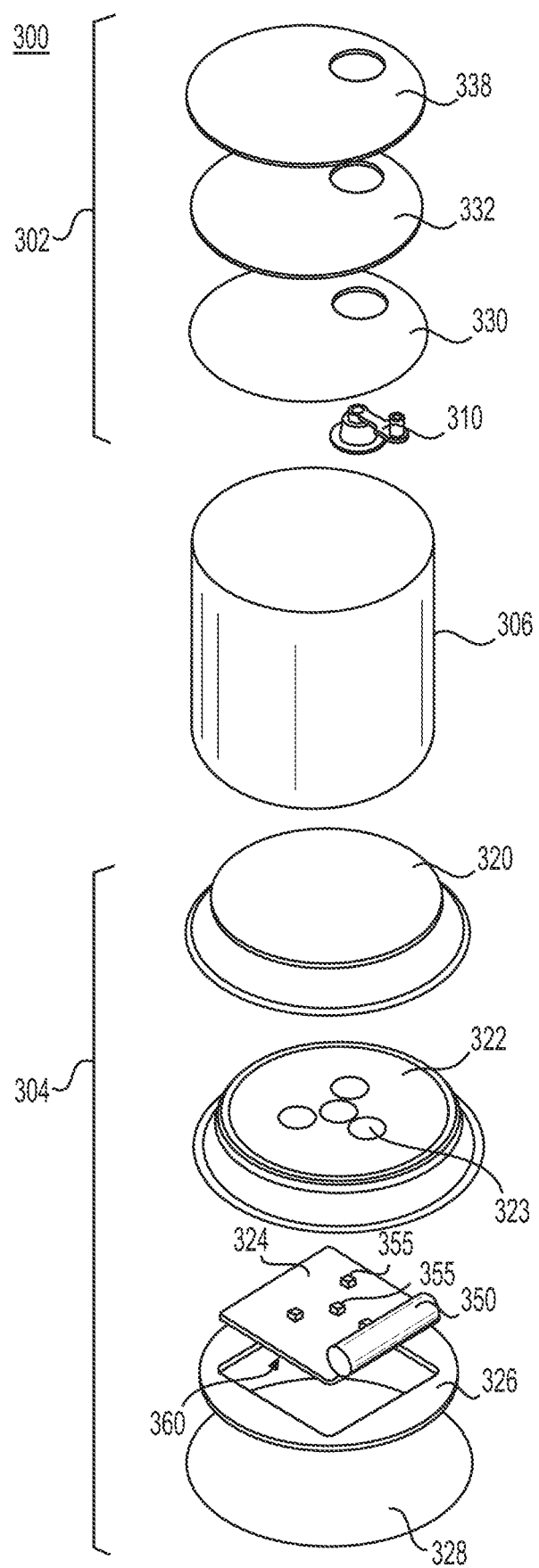

FIGS. 3A-3C illustrate another exemplary device 300, which may be collapsible and portable, and may include any of the features of devices 100 and/or 200 discussed above. In some embodiments, the device 300 may include a housing 301 with dimensions that make it relatively more compact than device 100 discussed above, e.g., having a smaller height and/or width. In some embodiments, the dimensions and/or operating modes of the device 300 may be useful in case of emergency (see discussion below), although the device 300 is not limited to such uses. The housing, 301 may include a first wall 302, a second wall 304, and one or more side walls 306. e.g., one generally cylindrical side wall 306. The first wall 302 may include a valve 310, e.g., substantially similar to the valve 110 of device 100. The second wall 104 may include a solar panel 360 and power button 380, e.g., substantially similar to the solar panel 160 and power button 180, respectively, discussed above. While not shown, the device 300 may include a display, e.g., a power level indicator, and/or may include a sensor substantially similar to the display 182 and sensor 184, respectively, discussed above.

As shown in the exploded view of FIG. 3C, the first wall 302 may include a first outer panel 338, a disc 332, and a first inner panel 330; and the second wall 304 may include a second inner panel 320, a reflector 322, a PCB assembly 324, a frame 326, and a second outer panel 328. The PCB assembly 324 may include any of the features of the PCB assembly 124 discussed above. For example, the PCB assembly 324 may include a battery 350, such as a lithium iron phosphate battery, and one or more lights 355, e.g., a plurality of LEDs (e.g., four LEDs as shown). The lights 355 may be disposed in a pattern in the central area of the PCB assembly 324, as illustrated in FIG. 3C, or any other suitable arrangement. The reflector 322 may include an opening 323 generally aligned with each light 355, e.g., a plurality of four openings 323 to allow emitted light to pass through the reflector 322 and into the housing 301. The reflector 322 may comprise a rigid plastic such as PVC with a reflective plating or coating. The second inner panel 320 may be flexible, and may comprise clear PVC or other materials configured to allow light emitted from the LEDs to pass into the housing 301. While not shown, the PCB assembly 324 may include a microprocessor substantially similar to the microprocessor 153 discussed above, e.g., for operating, and controlling the device 300.

In some embodiments, the inner surface of the second wall 304 may be at least partially inclined, For example, the reflector 322 and/or the second inner panel 320 may have inclined edges to form a generally frustoconical shape. The second inner panel 320 may form an airtight and/or watertight seal with the reflector 322.

Figure 12A:
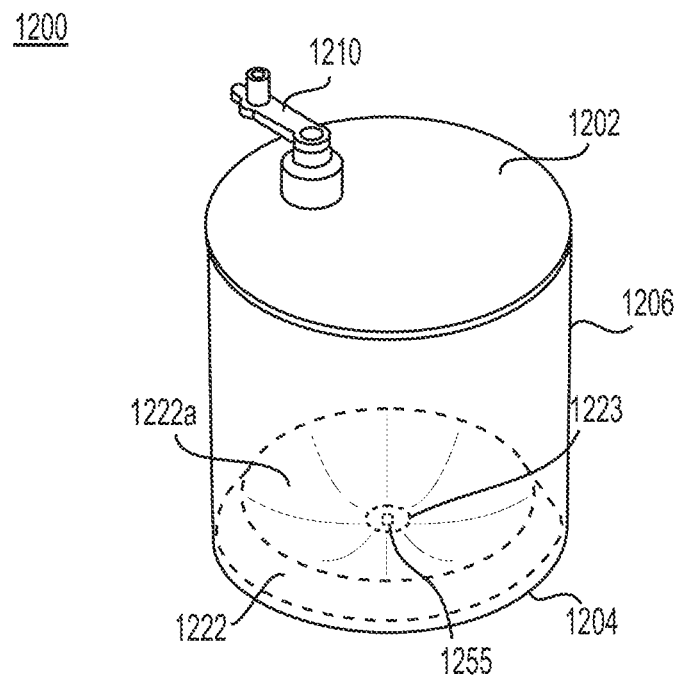
FIGS. 12A and 12B show an exemplary device, in accordance with one or more embodiments of the present disclosure.
Figure 12B:
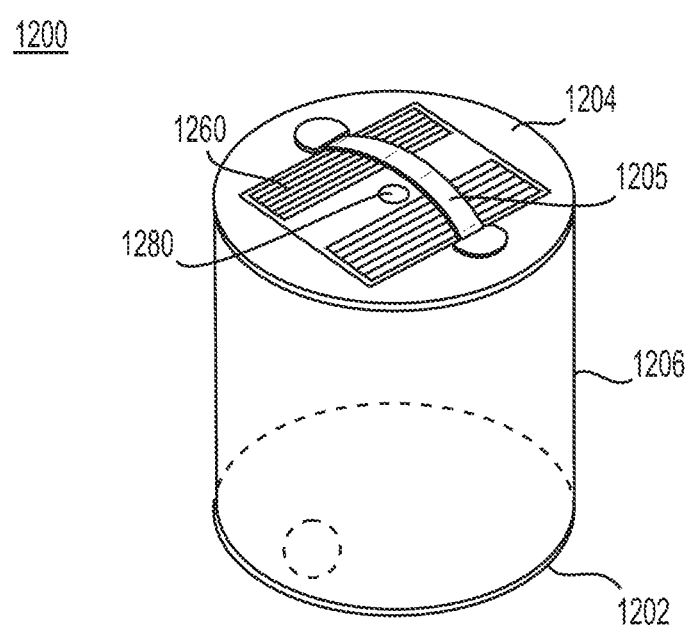

As mentioned above, devices according to the present disclosure may be configured to provide for a flashlight or spotlight effect. FIGS. 12A and 12B show an exemplary device 1200, which may include any of the features of devices 100, 200, and/or 300 discussed above. For example, the device 1200 may include a housing including a first wall 1202, a second wall 1204, and one or more side walls 1206. The first wall 1202 may include a valve 1210, e.g., substantially similar to valves 110 and/or 310 of devices 100 and 300, respectively. The second wall 1204 may include a solar panel 1260, which may be substantially similar to solar panels 160 and/or 360 of devices 100 and 300, respectively, a handle 1205, and a power button 1280.

As shown, the device 1200 may include only one light, e.g., one LED 1255, coupled to a portion of the second wall 1204, such as a PCB assembly. The LED 1255 may be configured to emit any color of light and/or to cycle between different colors. The second wall 1204 may include a reflector 1222, which may include any of the features of reflectors 122 and/or 322 of devices 100 or 300, respectively. The reflector 1222 may include a single opening 1223 generally aligned with the LED 1255 to allow light emitted from the LED 1255 to pass through the reflector 1222 and into the housing. In some embodiments, the inner surface 1222a of the reflector 1222 may be reflective, and may he concave in order to focus the light towards the center of the first wall 1202 to exit the housing. For example, at least a portion of the first wall 1202 may be transparent or translucent to allow light to pass therethrough. In some embodiments, the side wall(s) 1206 may be configured to at least partially reflect light emitted from the LED 1255 into the housing to exit through the first wall 1202, or may be configured to at least partially block light from exiting through the side walk(s) 1206 in order to exit through the first wall 1202.

The present disclosure is not limited to the particular configurations and features depicted in the figures and discussed above. For example, devices according to the present disclosure may include other types and configurations of valves than valves 110, 210, 310 and 1210 discussed above, e.g., configured to control the ingress and egress of air or other suitable gas) into and out of the devices.

Any of the devices disclosed herein may be configured to operate according, to at least one protocol or operating mode. While the following discussion may refer to certain features of the device 100 of FIGS. 1A-1D for illustration purposes, the features and principles are applicable to any other device disclosed herein.

In an exemplary "normal" operating mode, the device 100 may operate within a set of default or average operating parameters. For example, initiating the normal mode may cause the battery 150 to operate at an average voltage, and may turn on all or only some of the lights 155 (e.g., LEDs). In a "sleep" or "off" operating mode, all lights 155 (e.g., LEDs), of the device 100 may be turned off. In some embodiments, the battery 150 may continue to provide power to one or more other components of the PCB assembly 124, such as the sensor 184, microprocessor 153, and/or transceiver 157.

The device 100 may include one or more operating modes wherein the battery 150 may operate at voltages greater or less than the average voltage, e.g., causing the LEDs to brighten or dim, respectively. In some embodiments, the battery 150 may operate with pulse width modulation (PWM), wherein the battery voltage may be modified (increased, or decreased) by changing, the duty cycle. For example, the duty cycle may be changed to cause the LEDs to flash on and off in a "flash" or "emergency" mode. All or some of the LEDs may flash on and off regularly and/or in a specific pattern. For example, the LEDs may flash on and off to communicate textual information, such as the "SOS" distress signal in Morse code. Further, flashing frequency may operate as a timer, wherein each flash of light emitted by the device 100 corresponds to a predetermined unit of time. For example, the device 100 include an operating mode wherein one or more LEDs may flash in a regular pattern, such as one flash per second, per 2 seconds, per 5 seconds, etc. In some embodiments, the device 100 may include a "flicker" operating mode to simulate flickering candle light, e.g., according to an algorithm of the microprocessor 153. Further, the device 100 may include different operating modes with more frequent flickering, e.g., in a "windy" operating mode, and less frequent flickering, e.g., in a "calm" operating mode.

In some embodiments, the device 100 may include LEDs or other lights 155 configured to emit different types and/or colors of light (e.g., multicolor LEDs) or light-specific (e.g., red. LEDs, blue LEDs, etc.), such that the operating modes may selectively control each LED to achieve a particular color or effect. The device 100 may have a different operating mode for each color, e.g., "red" "orange," "yellow," ""green," "blue," "violet," and "white" modes, and/or color combinations thereof, such as "magenta," "cyan," and "amber" modes. In some embodiments, the device 100 may be used as a fishing, light attractor, e.g., wherein operating the device 100 in a "green" operating mode may attract fish towards the light.

Further, the device 100 may have one or more different operating modes for each type of light, such as "infrared" and/or "UV" modes. In some embodiments, for example, the device 100 may include a "UV" operating mode configured for water disinfection/sterilization. e.g., emitting shortwave or UV-C light within a suitable wavelength range, such as from about 250 nm to about 270 nm. In some embodiments, the device 100 may have a "UV" operating mode emitting longer wavelengths of UV light, e.g., UV-A, for recreational use, such as from about 315 nm to about 400 nm. In some embodiments, the device 100 may include an "infrared" operating mode as a heat source, e.g., a low-grade or temporary source of heat.

In some embodiments, the device 100 may have at least "blue" and "red" operating modes, e.g., for use in a diurnal setting. For example, a user may select the "blue" mode during the day, e.g., for an energy boost, and the "red" mode at night, e.g., to facilitate sleep or as a night light. The device 100 may include additional operating modes responsive to environmental conditions detected by the sensor 184. For example, the sensor 184 may be configured to detect environmental light to determine the diurnal cycle automatically.

Thus, for example, the device 100 may have a "diurnal" operating mode that automatically cycles the device 100 between "red" and "blue" operating modes according to the diurnal cycle detected by the sensor 184.

Further, the device 100 may have operating modes for turning the device 100 on and off based on information from the sensor 184. In some embodiments, the sensor 184 may be configured to detect environmental lighting conditions, such that the device 100 may have an "auto on/off" operating mode wherein the device 100 may turn on or off based on an amount of light detected by the sensor 184. For example, the device 100 may turn all LEDs on when the sensor 184 detects light equal or greater than a threshold value, and/or may turn all LEDs off when the light falls below the threshold value, or vice versa.

In some embodiments, the device 100 may be configured to generate sound. For example, the device 100 may include a speaker integrated into the device 100 and/or an audio output for connection to an external speaker or audio-generating or audio-amplifying device. The device 100 may include one or more operating modes for generating various sounds, including, but not limited to, white noise, babbling brook, wind, lightning storm, bird sounds, crickets, waterfall, rainfall, and/or crashing waves, among other natural soundscapes. Further, the device 100 may play music, e.g., via an integrated MP3 player or other suitable audio player) and/or by connecting the device 100 to an MP3 player for other suitable audio player).

Various operating modes of the device 100 may combine light and sound. For example, the device 100 may be configured to modify light output from one or more lights 155 according to the sound and/or rhythm of music generated and/or detected by the device 100. For example, the sensor 184 may be configured to detect one or more characteristics of the sound waves, e.g., frequency (pitch), amplitude (loudness), and/or rhythmic patterns. Data from the sensor 184 may be communicated to the microprocessor 153 for operating and controlling, the device 100 based on the one or more characteristics of the sound waves. In one embodiment, the color and/or intensity of light may be automatically adjusted based on a detected tone of music and/or a tone of a detected human voice. Alternatively, the color and/or intensity of light may change based on a detected volume of sound (music or voice), a detected pitch of sound (music or voice), or a detected mood of sound (music or voice).

In some embodiments, the device 100 may be configured to cycle through two or more different operating modes. Each operating mode may be initiated on-demand via user input and/or may operate according to an automatic transition sequence. In some embodiments, for example, each push of the power button (e.g., power button 180 of device 100 shown in FIG. 18) may initiate a change of the LED color from one color to the next, between being in an off position to being in an "on" position. For example, a first push of the button may select a first color, a second push of the button may select a second color, and so on. Alternatively or additionally, the power button may be selectively operated to place the device in an automatic "color cycling" mode, e.g., a transition sequence. For example, the device 100 may include a "color cycle" operating mode that changes colors according to a preset or randomized algorithm of the microprocessor 153. For example, in a "color cycle" operating mode, the device 100 may alternate or cycle between multiple colors, e.g., from red light to green, blue, magenta, yellow, cyan, orange, and white light, reinitiating the cycle by emitting red light, etc. The "color cycle" operating mode may include any umber of colors and/or sequence of colors. The device 100 may emit each color of light for a given period of nine before changing to the next color. For example, the device 100 may emit red light (or any other color) from about 3 second to about 5 minutes, e.g., about 5, about 10, about 15, about 30, or about 45 seconds, about 1 minute, or about 3 minutes. The device 100 may fade in and out of each color, such that one color gradually transitions into the subsequent color, e.g., over a period of time from about 1 second to about 5 seconds, e.g., about 2 or 3 seconds. The device 100 may achieve a fading effect by increasing and decreasing the intensity of the LEDs, e.g., via changing the PWM duty cycle with respect to each LED color. For example, the intensity of the LEDs may be changed to provide for fading, in and out by modifying the duty cycle on the order of milliseconds.

In at least one embodiment, the microprocessor 153 is configured to control a plurality of operating modes of the LEDs based on selection of a button, e.g., the power button, for controlling selection of at least one of the operating modes of the LEDs. In one embodiment, the microprocessor 153 enables changing a color of light emitted from the housing such that a first press of the button causes the plurality of LEDs to emit a tint color of light, a second press of the button causes the plurality of LEDs to emit a second color of light, a third press of the button causes the plurality of LEDs to emit a third color of light, and an nth press of the button causes the plurality of LEDs to initiate a transition sequence, the transition sequence causing the plurality of LEDs to begin emitting, the first color of light, gradually change to the second color of light, gradually change to the third color of light, and gradually change to the nth color of light. For example, a first press of the button may cause the LEDs to emit red light, a second press of the button may cause the LEDs to emit orange light, a third press of the button may cause the LEDs to emit yellow light, a fourth press of the button may cause the LEDs to emit green light, a fifth press of the button may cause the LEDs to emit green light, a sixth press of the button may cause the LEDs to emit blue light, and so on. In at least one embodiment, if the microprocessor is programmed to cause the button to selectively cycle between "n" colors, then pressing the button one more time, i.e., n+1 times, causes the microprocessor to initiate the LEDs to cycle through a transition sequence between all "n" colors.

For initiating different operating modes, the device 100 may accept input via the power button 180 (e.g., manual input), the sensor 184 (e.g., environmental input), and/or the transceiver 157 (e.g., wireless input). In some embodiments, pushing, the power button 180 a certain number of times may signal the device 100 to initiate a particular operating mode. For example, pushing the power button 180 once may initiate a "normal" operating mode, turning all of the LEDs of the device 100 on (e.g., with respect to a "sleep" mode as discussed above), pushing the power button 180 twice may increase the intensity of the LEDs in a "high" operating mode, pushing the power button 180 three times may decrease the intensity of the LEDs in "low" operating mode, pushing the power button 180 four times may cause the LEDs to flash in an "emergency" operating mode, and pushing the power button five times may turn all of the LEDs off, e.g., returning the device 100 to the "sleep" operating mode. In some embodiments, holding the power button 180 down for a specific amount of time may initiate different modes, For example, a user may push the power button 180 down for about 1 second to initiate the "normal" mode, about 2 seconds for the "high mode," about 3 seconds for the "low" mode, about 4 seconds for the "emergency mode," and about 5 seconds for the "sleep" mode.

In addition to manual input, or as an alternative, the device 100 may change between different operating modes based on data from the sensor 184. As mentioned above, the sensor 184 may detect changes in one or more environmental conditions, such as lighting, sound., motion, and/or moisture. Once the parameter measured by the sensor 184 equals, exceeds, or falls below a threshold value, the microprocessor 153 may be programmed to initiate a particular operating cycle. Examples include the "diurnal," and "auto on/off" operating modes discussed above, but are not limited to those examples, and are not limited to operating modes based on the sensor 184 measuring lighting conditions. Further, the device 100 may accept input wirelessly that signals to the device 100 to initiate different operating modes. For example, a user may use the remote control 170 to switch from one operating mode to another. In some embodiments, input via the power button 180 or wireless input via the transceiver 157 may override environmental input via the sensor 184.

In some embodiments, the microprocessor 153 may be pre-programmed to initiate different modes at different times. For example, the microprocessor 153 may include an algorithm to run the device 100 in a "blue" operating mode from 7 am to 7 pm, and a "red" operating mode from 7 pm to 7 am. In some embodiments, input via the power button 180 or wireless input via the transceiver 157 may override the pre-programming of the microprocessor 153. Any of the aforementioned operating. modes may be combined with music, e.g., an alarm operating, mode wherein the device 100 plays music and/or adjusts light output at a predetermined time, such as a wake-up alarm.

Figure 4A:
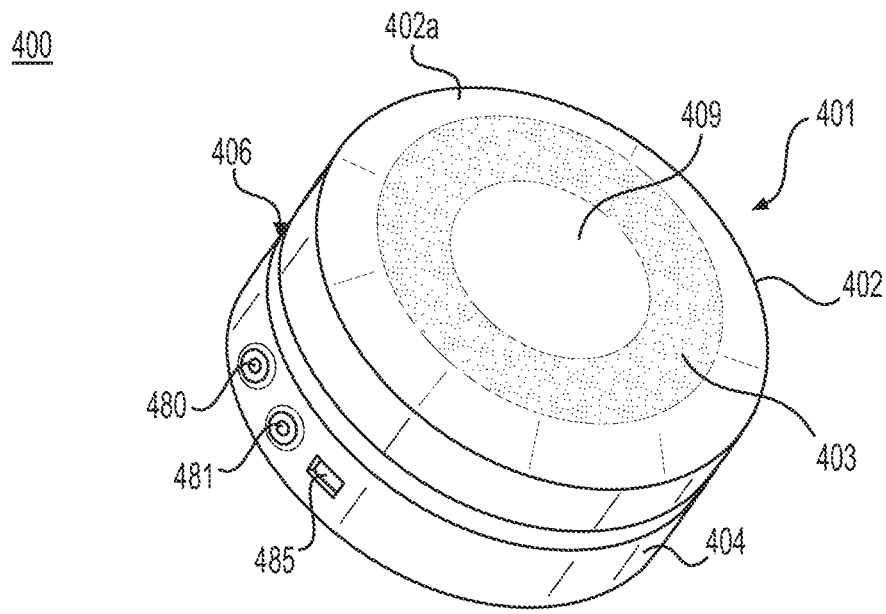
FIGS. 4A-4C show an exemplary device, in accordance with one or more embodiments of the present disclosure.
Figure 4B:
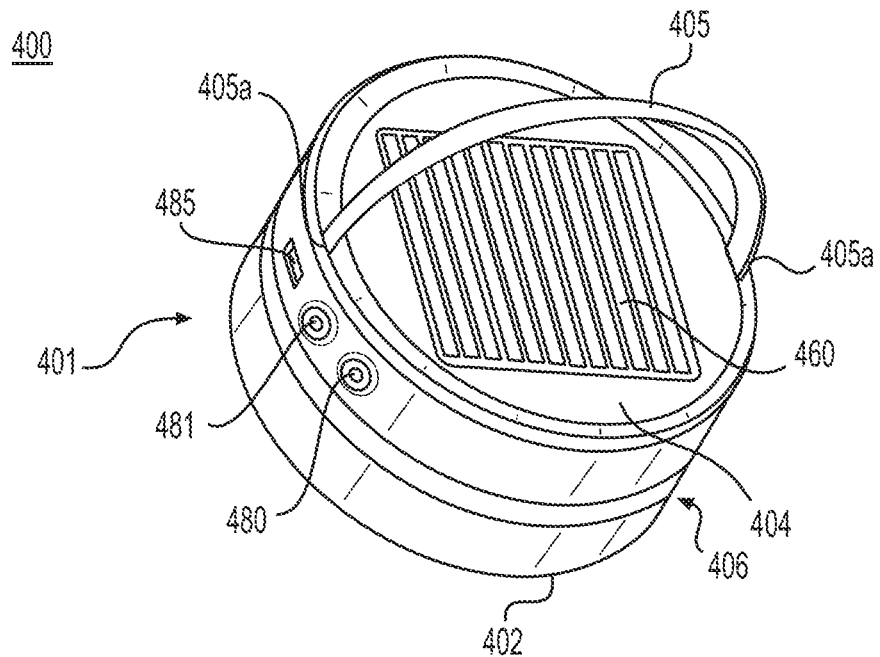
Figure 4C:
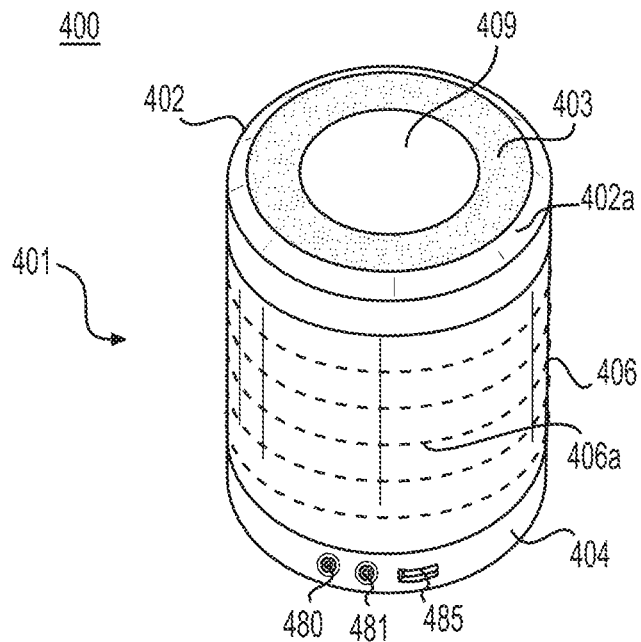

While the above discussion illustrates exemplary inflatable devices 100, 200, 300, and 1200, the present disclosure is not limited to inflation. FIGS. 4A-4C show an exemplary collapsible device 400 that need not be inflated to expand the device 400. FIGS. 4A and 4B show top and bottom views, respectively, of the device 400 in a collapsed configuration, and FIG. 4C shows the device 400 in an expanded configuration. The device 400 may comprise a housing 401 including a first wall 402, a second wall 404, and one or more side walls 406. The side wall(s) 406 may include one or more folds 406a in the width dimension e.g., the fold(s) 406a being substantially parallel to the first and second walls 402, 404) to allow the adjacent folded portions to collapse upon one another, e.g., similar to the bellows of an accordion.

The device 400 may include a spring-load mechanism, e.g., in the second wall 404, which, when actuated, may cause the side wall(s) 406 to expand and/or collapse, thereby expanding and/or collapsing the housing 401. For example, the spring-load mechanism may cause the first wall 402 to move away from the second wall 404 to expand the housing 401, and/or to move towards the second wall 404 to collapse the housing 401. In some embodiments, the device 400 may be inflatable, rather than spring-load expandable.

The side wall(s) 406 may include any of the shapes, sizes, configurations, and/or features of the side wall(s) 106 of device 100 discussed above. In some embodiments, the side wall(s) 406 may comprise polypropylene, e.g., with a shiny or matte finish. The side wall(s) 406 may comprise any other suitable materials, such as paper (e.g., paper with a plastic backing, or otherwise configured to be airtight and water tight or moisture-resistant) or other materials.

As shown in FIGS. 4A and 4C, the first wall 402 may be at least partially angled or inclined, having an angled surface 402a. An inner portion 403 of the first wall 402 may be opaque, and may define an opening 409 configured to allow light to pass therethrough. For example, the opening 409 may comprise clear PVC or other transparent or translucent materials. In some embodiments, for example, the first wall 402 may include an outer sheet or covering. Of clear PVC. The angled surface 402a or portions thereof may be opaque, transparent, or translucent. In some embodiments, the inner portion 403 may serve to focus light, emitted from the housing 401 into a beam as it passes through the opening 409. For example, the device 400 may provide a focused beam of light similar to a flashlight. In some embodiments, the inner portion 403 may comprise part of a removable sleeve or end cap configured to fit onto the first wall 402 to focus the light emitted from the housing 401.

As shown in FIG. 4B, the second wall 404 may include a solar panel 460, which may include any of the features of the solar panel 106 of device 100 discussed above. In some embodiments the solar panel 406 may include a single array of solar cells 406, e.g., to maximize coverage of the second wall 406 for energy generation. The solar panel 406 may be coupled to a PCB assembly substantially similar to the PCB assembly 124 of the device 100 discussed above, e.g., the PCB assembly being coupled to a battery and one or more lights, such as LEDs. The solar panel 406 may be covered by clear PVC for protection and configured to allow exposure to natural and/or artificial light for charging the battery.

Each of the first wall 402 and the second wall 404 may comprise a rigid plastic material, a metal, a metal alloy, or a combination thereof. In some embodiments, each of the first and second walls 402, 404 may comprise acrylonitrile butadiene styrene (ABS), e.g., injection-molded ABS, optionally with a metallized finish, e.g., metallized chrome finish. In some embodiments, the device 400 may include a handle 405 coupled to the housing. For example, the handle 405 may be attached to the second wall 404 as shown in FIG. 4B. In some embodiments, the ends 405a of the handle 405 may be configured to pivot with respect to the second wall 404 such that the handle 405 may lay fiat against the second wall 404 when not in use.

The second wail 404 may include a power button 480, and one or more of a timer button 481 and an electronic port 485. The power button 480 may be used to control different operating modes of the device 400, e.g., as described above with respect to the power button 180 of device 100. The timer button 481 may be used to set a time at which an operating mode of the device 400 may be initiated. For example, the timer button 481 may correspond to initiation of a "dawn simulator" mode, wherein the lights (e.g., LEDs) of the device 400 gradually brighten to simulate sunrise. The "dawn simulator" mode may gradually turn on and/or increase the intensity of the LEDs over a period of time ranging from about 5 minutes to 1 hour, e.g., from about 15 minutes to about 45 minutes, e.g., about 30 minutes or about 45 minutes. In some embodiments, the device 400 may include a "diurnal" operating mode as discussed above, in combination with the "dawn simulator" mode. For example, initiation of the "dawn simulator" mode may include gradually transitioning from red light (e.g., primarily used at night) to blue light (e.g., primarily used during the day).

In some embodiments the timer button 481 may program an integer number of hours until the "dawn simulator" mode commences. In sonic embodiments, holding the timer button 481 down may cause a timer LED to flash sequentially. The timer LED may be inside the housing 401, located within the timer button 481 or the power button 480, or may be a separate LED indicator on the housing 401). Holding the timer button 481 for about 1 second may correspond to 1 flash of the timer LED and set 1 hour until the "dawn simulator" mode commences, holding for about 2 seconds may correspond to two flashes and 2 hours, etc. The tuner button 481 may correspond to any other operating mode, including, but not limited to, any of the operating modes discussed above. Once the timer is set, the timer LED or one or more other lights/LEDs of the device 400 may flash a different color. In some embodiments, the timer button 481 may be used to initiate the "sleep" mode of the device 400, thereby canceling or overriding any other operating mode. The timer button 481 therefore may allow a user to turn the LEDs off without the need to cycle through other operating modes. In at least one embodiment, the device 400 may receive timing information for initiating different operating modes wirelessly or remotely. For example, the device 400 may receive input associated with the location, time zone, etc., of the device 400 from an application ("app") on a mobile phone, a GPS device, or airplane navigation system, e.g., for syncing the device 400 to the appropriate time zone or diurnal cycle when changing locations, such as during travel. Any other devices disclosed herein may include a timer button 481, e.g., for setting a desired time for a particular operating mode to begin.

Figure 5:
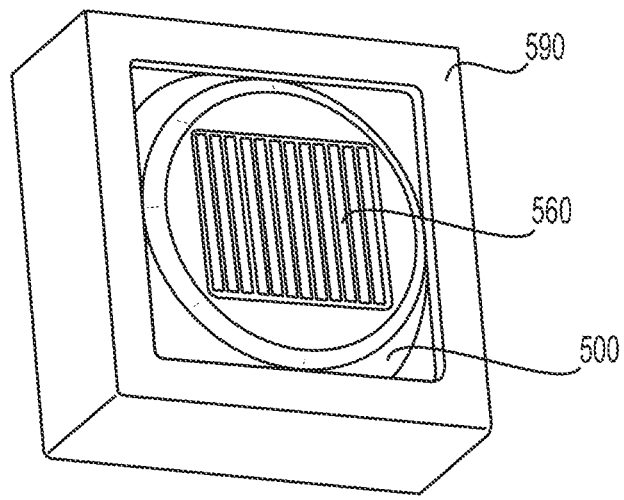
FIG. 5 shows exemplary packaging for devices according to embodiments of the present disclosure.

FIG. 5 illustrates exemplary packaging 590 for a device 500, suitable for a point of-purchase display. The device 500 may include any of the features of devices 100, 200, 300, 1200, and/or 400 discussed above. For example, the device may include a solar panel 560, which may be visible through a clear window of the packaging 590. The window may comprise a clear plastic that allows natural and/or artificial light to pass through the packaging 590 to reach the solar panel 560. Thus, the device 500 may charge while on display, such that it may be ready for use upon removal from the packaging 590. The packaging 590 may comprise any material or combination of materials to protect the device 500 while on display. Exemplary materials include, but are not limited to, rigid materials such as cardboard or plastic.

Devices according to the present disclosure may be configured to use solar energy generated and stored in the devices to provide power to other electronics, e.g., as a charger. For example, the devices disclosed herein may include at least one electronic connector compatible with one or more electronic devices. Exemplary electronic connectors include, but are not limited to USB and USB-like connectors (USB-A, USB-B, micro-USB, etc.) and Lightning connectors (e.g., for electronic devices manufactured by Apple). Any of the electronic connectors disclosed herein may be male or female connections.

Figure 6A:
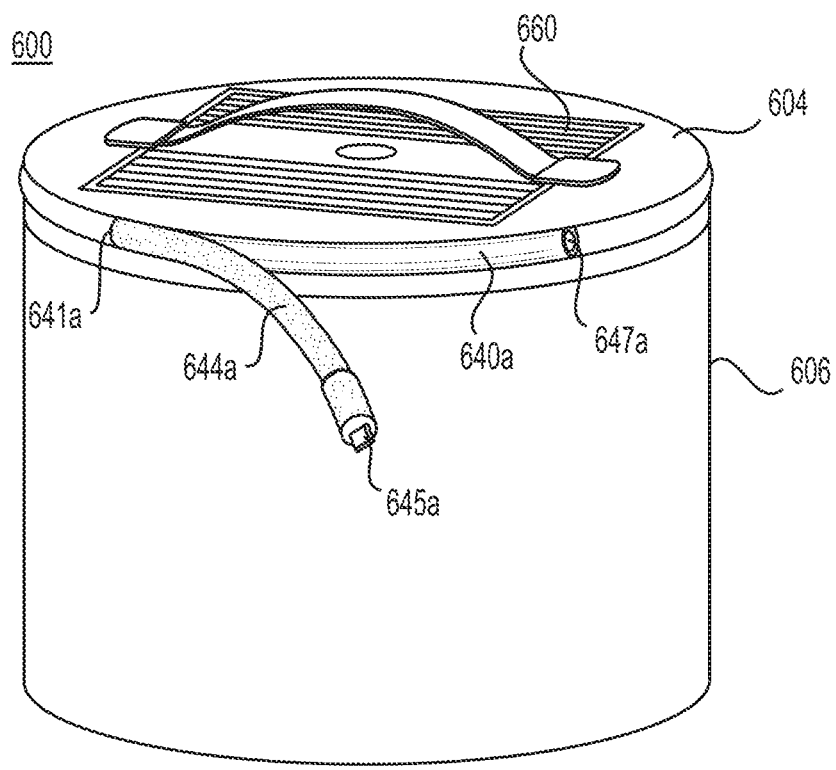
FIGS. 6A and 6B illustrate exemplary devices, in accordance with one or more embodiments of the present disclosure.
Figure 6B:
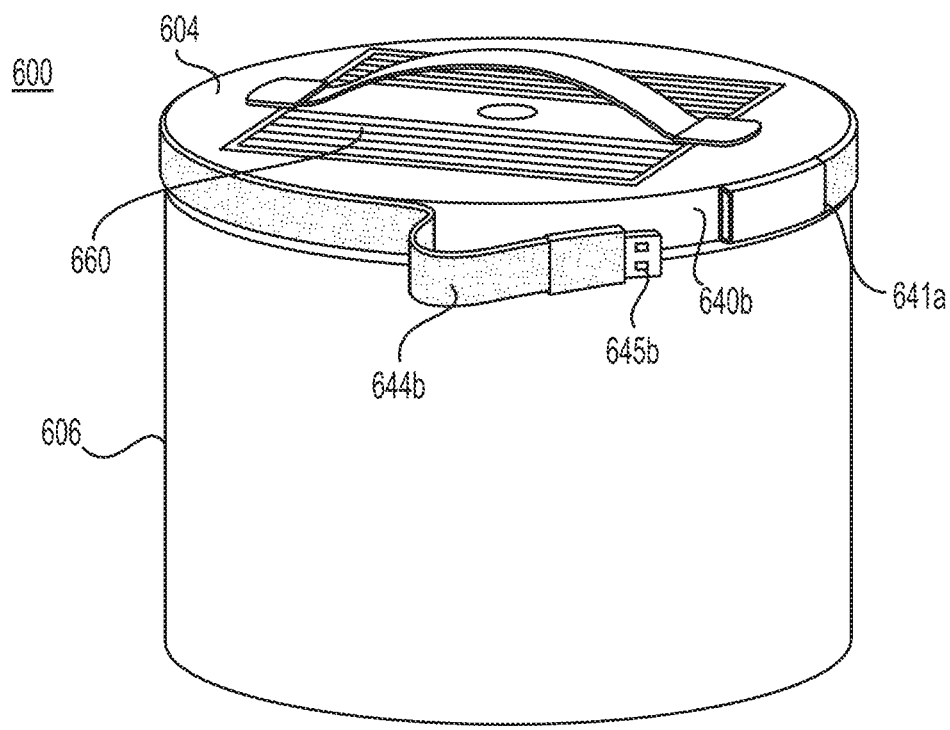

FIGS. 6A and 6B illustrate alternative configurations of an exemplary device 600, which may include any of the features of devices 100, 200, 300, 1200, 400, and/or 500 discussed above. The device 600 may comprise a housing that includes a second wall 604 and one or more side walls 606, e.g., a single cylindrical side wall 606 as shown, or any other number of side walls 606. The second wall 604 may include a solar panel 660.

In the configuration shown in FIG. 6A, the perimeter of the second wall 604 or the portion of the side wall(s) 606 adjacent to the second wall 604) may include a recessed area or groove 640a, and a cord 641a configured to fit within the groove 640a. In some embodiments, the cord 644a may have a generally circular cross-section. The end of the cord 644a may include an electronic connector 645a, such as an electronic adapter or port compatible with one or more electronic devices. The cord 644a may be fixedly attached to an end 641a of the groove 640a. The cord 644a may be flexible, such that the end of the cord 644a including the electronic connector 645a may be detached and pulled away from the groove 640a in use, e.g., to charge an electronic device, such as a mobile phone, tablet device, mp3 player, and/or other portable electronic devices. The cord 644a may be operably coupled to the solar panel 660 and battery inside the device 600 in order to supply power to the electronic device. For example, the end of the cord 644a opposite the electronic connector 645a may connect to the battery of the device 600 inside the second wall 604. While not in use, the electronic connector 645a may fit securely within a cavity 647a along the groove 640a.

The configuration shown in FIG. 6B is similar to that of FIG. 6A, comprising, a recessed area or groove 640b extending along the perimeter of the second wall 604, and a cord 644b configured to fit within the groove 640b. The cord 644b may have a generally rectangular cross-section, e.g., with a relatively narrow depth providing for a flat shape. The cord 644b may be flexible, and may include an electronic connector 645b compatible with one or more electronic devices. The cord 644b may be fixedly attached to an end 641b of the groove 640b. Similar to cord 644a, the cord 644b of FIG. 6B may be operably coupled to the solar panel 660 and the battery to provide power to the one or more electronic devices. While not in use, the electronic connector 645b may fit securely within a cavity 647b along the groove 640b.

Figure 7A:
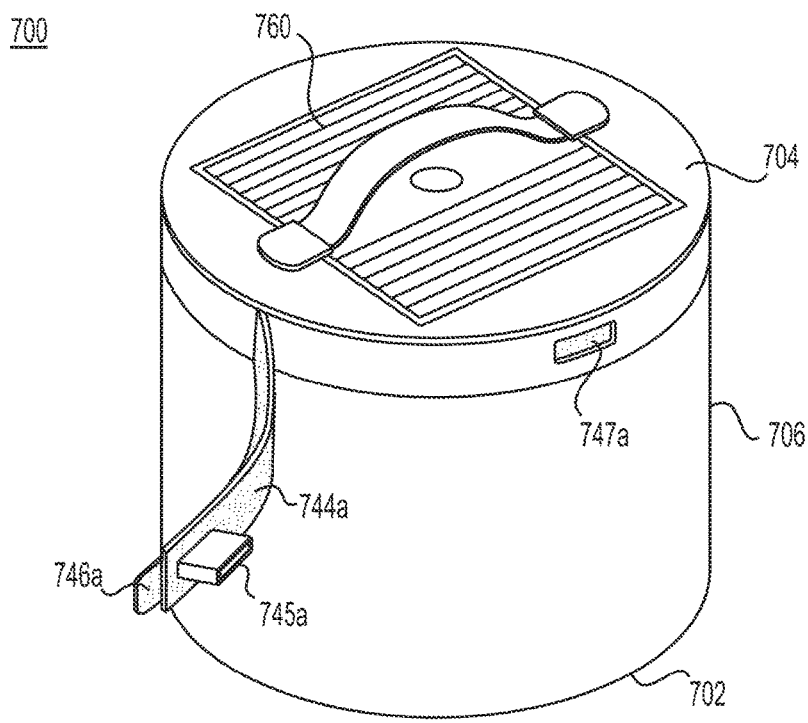
FIGS. 7A and 7B illustrate exemplary devices, in accordance with one or more embodiments of the present disclosure.
Figure 7B:
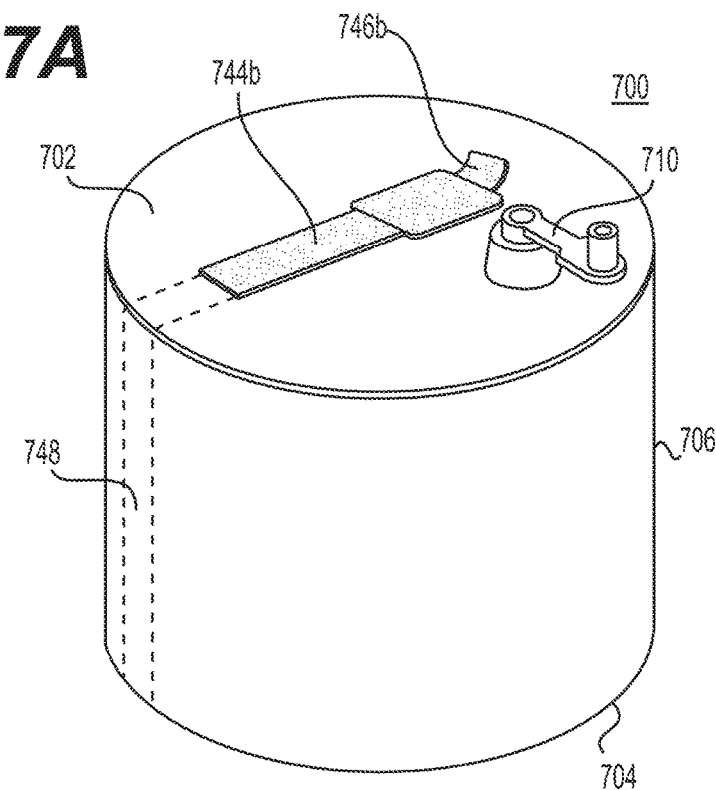

FIGS. 7A and 7B illustrate different configurations of an exemplary device 700, which may include any of the features of devices 100, 200, 300, 1200, 400, 500, and/or 600 discussed above. The device 700 may comprise a housing that includes a first wall 702, a second wall 704, and one or more side walls 706. The second wall 704 may include a solar panel 760, and the first wall 702 may include a valve 710, e.g., for inflating the housing. In some embodiments, the device 700 may not include a valve 710, and may be configured for expansion via a spring-load mechanism or other suitable expansion mechanism.

In the configuration shown in FIG. 7A, the device 700 may include a flexible cord 744a configured to lay against the side of the second all 704, e.g., adjacent to the side wall(s) 706. The cord 744a may include an electronic connector 745a, and may be operably coupled to the solar panel 760 and a battery inside the device 700. While not in use, the electronic connector 745a may fit securely within a cavity 747a of the second wall 704, e.g., in a stored position. The cord 744a may include a flexible tab 746a configured to be gripped by a user, to facilitate removing the electronic connector 745a from the cavity 747a by pulling on the tab 746a.

In the configuration shown in FIG. 7B, the device 700 may include a flexible cord 744b configured to lay against the first wall 702, e.g., in a stored position. The cord 744b may include an electronic connector 745b, and may be operably coupled to the solar panel 760 and battery inside the device 700 via a section 748 of the cord 744b extending, from the first wall 702 to the second wall 704. While not in use, the electronic connector 745a may fit securely within a cavity 747b of the first wall 704. The cord 744b may include a flexible tab 746b, similar to the tab 746a of FIG. 7A.

The configurations shown in FIGS. 7A and 7B may be alternatives of each other, e.g., the device 700 comprising either cord 744a or cord 744b. In some embodiments, however, the device 700 may comprise both cord 744a (attached to the second wall 704) and cord 744b (attached to the first wall 702 and operably coupled to the solar panel 760 of the second wall 704), wherein the electronic connectors 745a, 745b may be the same or different types of connectors.

Figure 8:
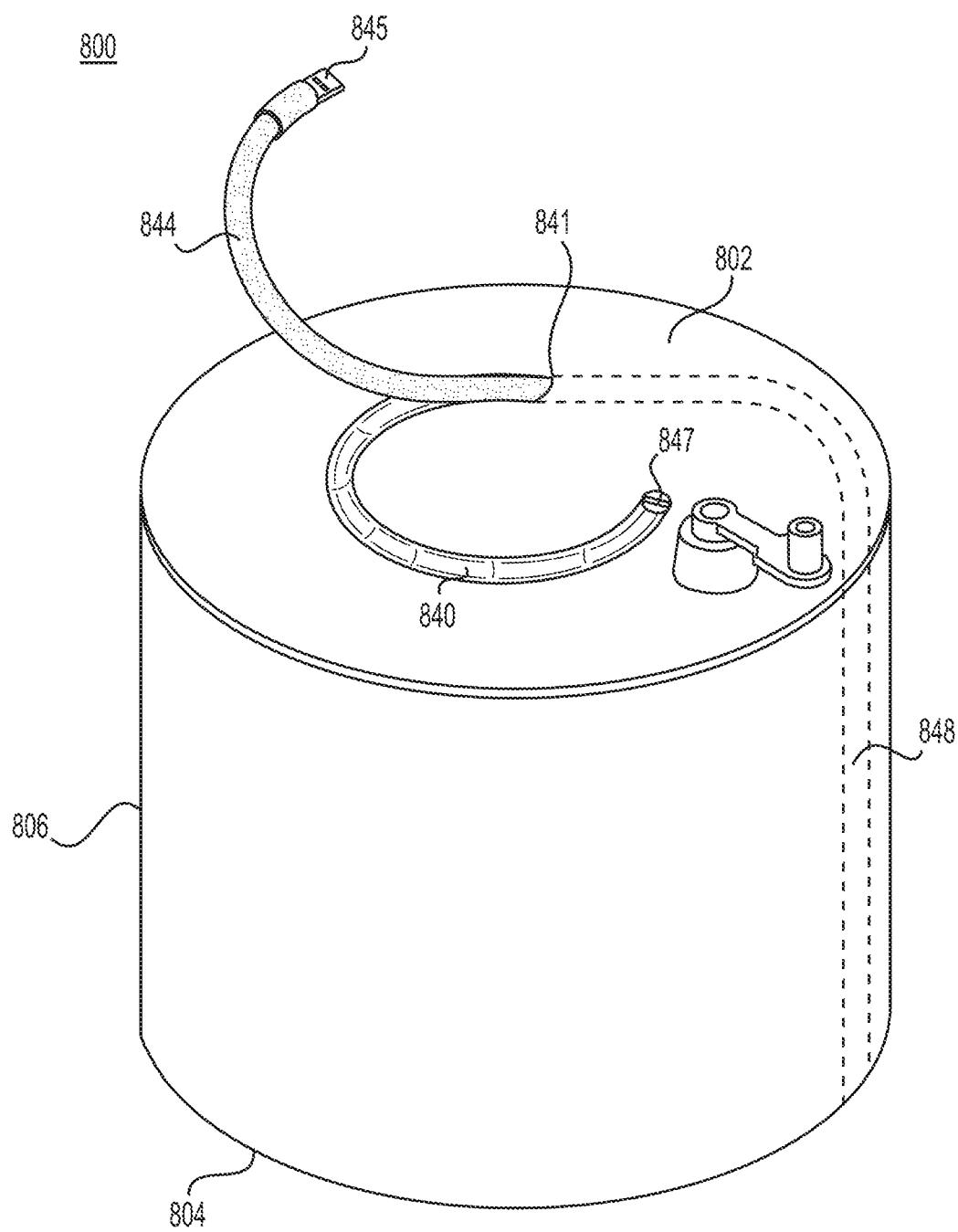
FIG. 8 illustrates an exemplary device, in accordance with one or more embodiments of the present disclosure.

FIG. 8 illustrates yet another exemplary device 800 including an electronic connector 845 compatible with one or more other electronic devices. The device 800 may include any of the features of devices 100, 200, 300, 1200, 400, 500, 600, and/or 700 discussed above. As shown, the device 800 may include a first wall 802, and a cord 844 extending through an opening in the first wall 802. One end of the cord 844 may include an electronic connector 845, and the other end of the cord may be operably coupled to a solar panel and battery of the device 800, e.g., in the second wall 804 of the device 800. For example, a section 848 of the cord 844 may extend between the first wall 802 and the second wall 804. In sonic embodiments, a portion of the cord 844 may be embedded within the first wall 802 (e.g., between a disc and a first outer panel similar to the disc 132 and the first outer panel 138, respectively, of device 100). In some embodiments, the first wall 802 may include a lumen configured to receive a portion of the cord 844. The outer surface of the first wall 802 may include as groove 840 to receive the cord 844 when not in use, e.g., in a stored position. For example, the electronic connector 845 may fit securely within a cavity 847 at the end of the groove 840.

While FIG. 8 illustrates the cord 844 extending from the first wall 802, in some embodiments, the cord 844 may extend from an opening in the side wall(s) 806 or the second wall 804. For example, the second wall 804 may include the solar panel, and a groove 840 adjacent to the solar panel, e.g., extending in an are around a portion of the solar panel.

Figure 9A:
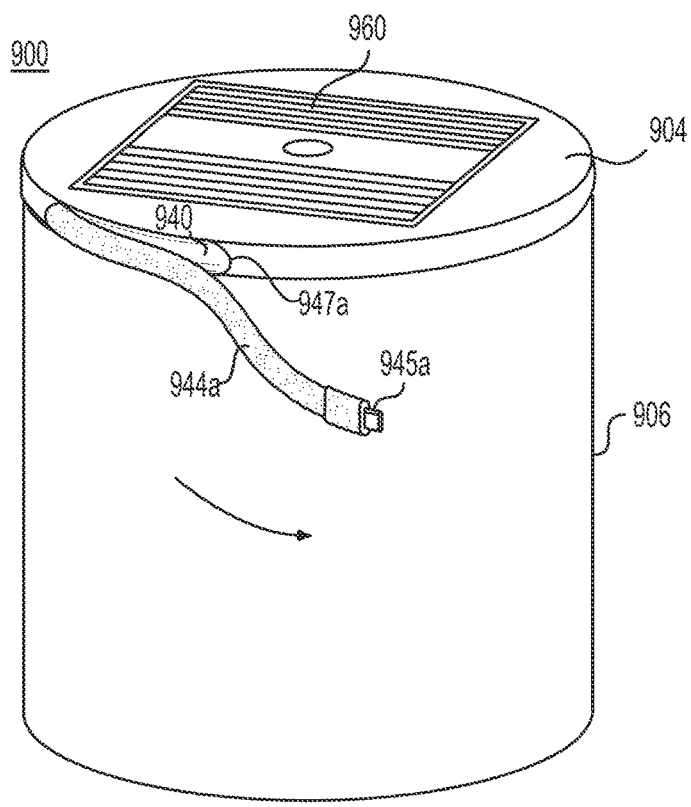
FIGS. 9A and 9B illustrate exemplary devices, in accordance with one or more embodiments of the present disclosure.
Figure 9B:
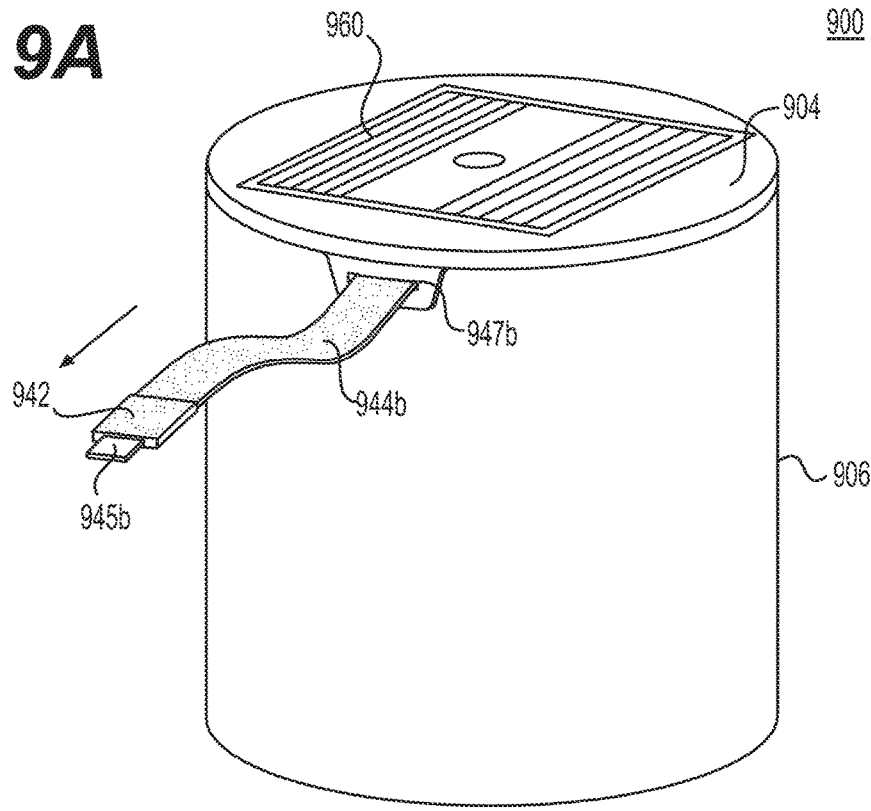

FIGS. 9A and 9B illustrate alternative configurations of an exemplary device 900, which may include any the features of devices 100, 200, 300, 1200, 400, 500, 600, 700, and/or 800 discussed above. The device 900 may comprise a housing that includes a second wall 904 and one or more side walls 906. The second wall 904 may include a solar panel 960.

The configuration of the device 900 shown in FIG. 9A may be similar to the configuration of the device 600 shown in FIG. 6A. For example, the device 900 may comprise a second wall 904 and one or more side walls 906, wherein the second wall 904 includes a recessed area or groove 940, and a cord 944a configured to fit within the groove 940. The end of the cord 944a may include an electronic connector 945a compatible with one or more electronic devices. The cord 944a may be operably coupled to a solar panel 960 and battery of the device 900. Rather than being fixedly attached to a portion of the groove 940, however, the cord 944a may be retractable, such that a user may pull the cord 944a to withdraw a longer length of the cord 944a from the device 900. The retraction mechanism also may allow the user to adjust the length of the cord 944a by reinserting a portion of the cord 944a into an internal portion of the groove 940. The retraction mechanism therefore may allow the user to adjust slack in the cord 944a to facilitate inserting the electronic connector 945 into an electronic device, e.g., for charging. An end of the groove 940 may include a cavity 947a to receive the electronic connector 945, e.g., in a stored position.

The configuration shown in FIG. 9B shows an alternative configuration of the device 900, comprising an opening 947b in the side of the second wall 904 through with a cord 944b may extend. The device 900 may include a retraction mechanism coupled to the second wall 904 to allow a user to increase slack in the cord 944b by pulling on the cord 944b in the direction of the arrow. The retraction mechanism also may allow the user to decrease slack in the cord 944a by reinserting a portion of the cord 944b into an internal cavity or groove. A portion of the cord 942 proximate the electronic connector 945 may have a greater cross-sectional area than the opening 947b to stop the cord 944b from completely withdrawing into the device 900.

Figure 10A:
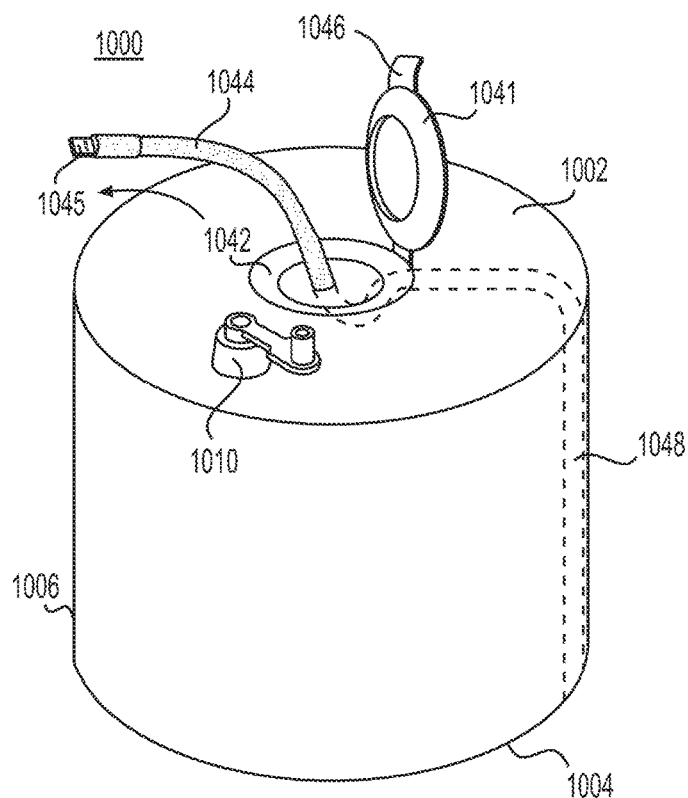
FIGS. 10A and 10B illustrate exemplary devices, in accordance with one or more embodiments of the present disclosure.
Figure 10B:
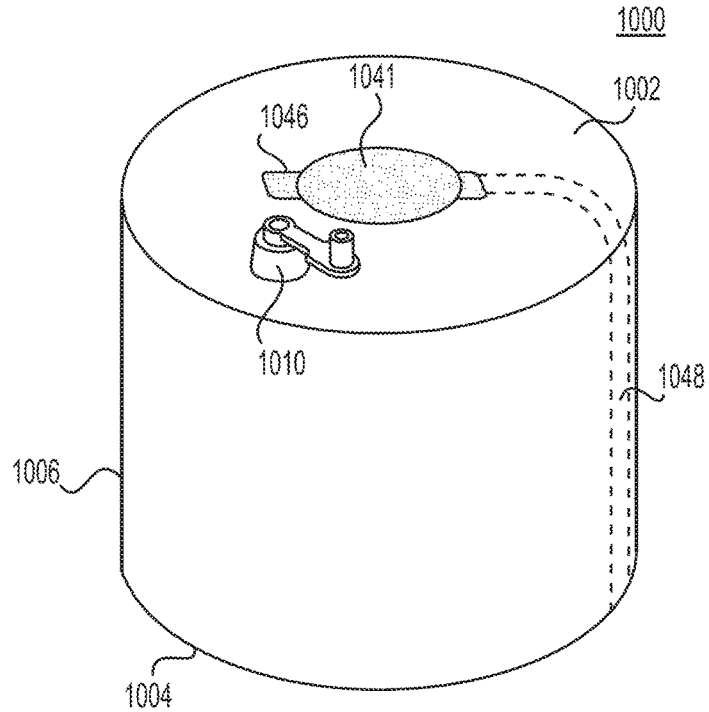

FIGS. 10A and 10B illustrate an exemplary device 1000 also comprising a retraction mechanism. The device 1000 may include any of the features of devices 100, 200, 300, 1200, 400, 500, 600, 700, 800, and/or 900 discussed above. As shown, the device 1000 may comprise a housing including a first wall 1002, which may include a valve 1010, and one or more side walls 1006. The device 1000 may include a cord 1044 comprising an electronic connector 1045, wherein the cord 1044 extends from an opening 1047 in the first wall 1002. The retraction mechanism may operate similarly to those discussed above in connection to device 900, e.g., to allow a user to adjust slack in the cord 1044. The cord 1044 may include features to prevent the cord 1044 from completely withdrawing into the device 1000. For example, a proximal portion of the cord 1044 may have a cross-sectional area greater than a cross-sectional area of the opening 1047.

The first wall 1002 may include a latching mechanism, such as a stopper 1041, to cover the cord 1044 and the opening 1047 when the cord 1044 is not in use, e.g., in a stored position. The stopper 1041 may have a shape compatible with a recessed area 1042 around the opening 1047, e.g., to form a seal when closed as shown in FIG. 10B. The stopper 1041 may include a tab 1046 configured to be gripped by a user to facilitate opening the stopper 1041 to access the cord 1044. The end of the cord 1045 opposite the electronic connector 1045 may be operably coupled to a solar panel and battery of the device 1000. e.g., in the second wall 1004 of the device 1000. For example, a section 1048 of the cord 1044 may extend between the first wall 1002 and the second wall 1004 In some embodiments, a portion of the cord 1044 may extend between portions of the first wall 1002, similar to device 800 discussed above, such that the cord 1044 may be isolated from the interior of the housing. Thus, a user may withdraw and reinsert the cord 1044 when the housing is expanded and during use of the device 1000, e.g., without compromising an airtight and watertight seal of the expanded housing.

While FIGS. 10A and 10B illustrate the cord 1044 extending from the first wall 1002, in some embodiments, the cord 1044 may extend from an opening in the side wall(s) 1006 or the second wall 1004. For example, the second wall 1004 may include the stopper 1041, e.g., adjacent to the solar panel.

Figure 11:
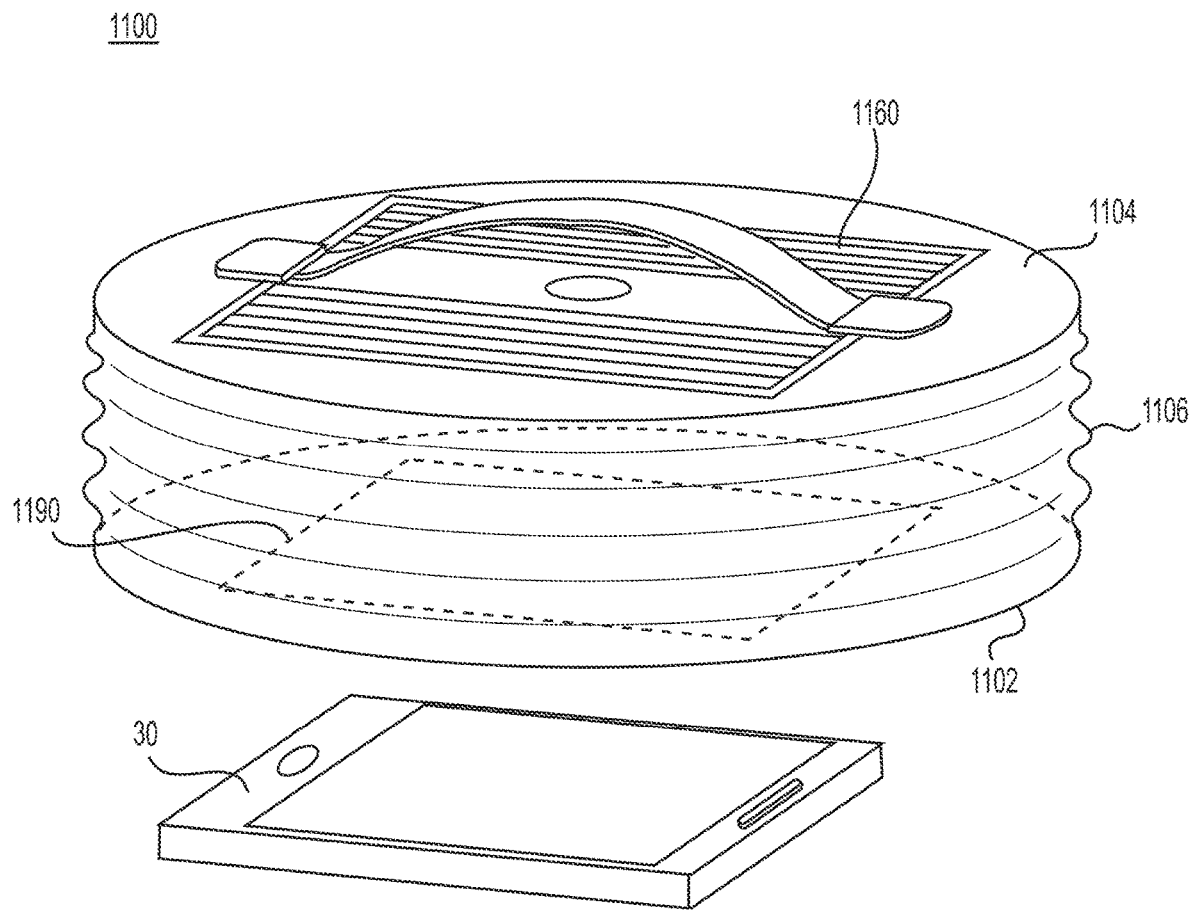
FIG. 11 illustrates an exemplary device, in accordance with one or more embodiments of the present disclosure.

In addition to, or as an alternative to the electronic connectors discussed above, devices according to the present disclosure may be configured to charge electronic devices via an induction pad. FIG. 11 illustrates an exemplary device 1100, which may include any of the features of devices 100, 200, 300, 1200, 400, 500, 600, 700, 800, 900, and/or 1000 discussed above. As shown, the device 1100 may comprise a housing including a second wall 1104, a first wall, and one or more side walls 1106 therebetween. The side wall(s) 1106 may be flexible to allow the housing to collapse (as shown in FIG. 11) and expand. The second wall 1104 may include a solar panel 1160, and the first wall 1102 may include an induction pad 1190 operably coupled to the solar panel 1160 and to a battery of the device 1100 (not shown) likewise coupled to the solar panel 1160.

For example, the induction pad 1190 may be positioned sufficiently close to the solar panel 1160 and battery for charging, e.g., when the device 1100 is in a collapsed configuration such that the first and second walls 1102, 1104 are in close proximity. In some embodiments, the induction pad 1190 may be directly coupled to the solar panel 1160 and battery, e.g., the induction pad 1190 being directly coupled to the second wall 1104. Further, in some embodiments, the first wall 1102 and/or second wall 1104 may include a recessed area of suitable dimensions to receive the induction pad 1190 in a nested configuration. A user may place an electronic device 30, such as a mobile phone, against the induction pad 1190 to charge the electronic device 30. By placing the device 1100 such that the solar panel 1160 is exposed to natural or artificial light, and the induction pad 1190 below is in contact with the electronic device 30, the solar panel 1160 may simultaneously generate and/or store energy while the induction pad 1190 charges the electronic device 30 via the generated/stored energy.

Any features disclosed herein in connection with one embodiment may be combined with any other embodiments. Other embodiments of the present disclosure will be apparent to those skilled in the art from consideration of the specification and practice of the embodiments disclosed herein. It is intended that the specification and examples be considered as exemplary only, with a true scope and spirit of the disclosure indicated by the following claims.

We claim:

1. A collapsible solar-powered lighting device comprising:
    a housing including a first wall, a second wall opposite the first wall, and one or more side walls extending between the first wall and the second wall, the one or more side walls including one or more folds extending parallel to the first wall and the second wall to collapse the first wall toward the second wall;
    at least one solar panel integrated into at least one of the first wall and the second wall, thereby defining the at least one of the first wall and the second wall that includes the at least one solar panel as an electronics wall of the housing;
    a plurality of light-emitting diodes (LEDs) integrated into the electronics wall of the housing, the plurality of LEDs facing an interior of the housing;
    a rechargeable battery integrated into the electronics wall, the rechargeable battery being electrically connected between the at least one solar panel and the plurality of LEDs, such that the rechargeable battery is configured to supply current generated by the at least one solar panel to the plurality of LEDs;
    a universal serial bus (USB) connector integrated into the electronics wall, the USB connector being in communication with the rechargeable battery and configured to transfer power between the rechargeable battery and an external electronic device, wherein the USB connector is covered by a moveable cover providing a seal with the electronics wall;
    an interface integrated into one or more of the first wall, the second wall, and the one or more side walls, the interface configured to enable user control of an operating mode of the plurality of LEDs;
    a microprocessor integrated into the electronics wall and electrically connected to the interface, the rechargeable battery, and the plurality of LEDs; and
    a current regulator operably coupled to the rechargeable battery and the microprocessor, the current regulator regulating current delivered to the plurality of LEDs as controlled by the microprocessor;
    wherein the microprocessor is configured to control the operating mode of the LEDs via input from the interface.

2. The device of claim 1, wherein each of the first wall and the second wall is substantially square and planar, and wherein the housing is expandable to convert the housing from a collapsed configuration to an expanded configuration by unfolding the one or more side walls.

3. The device of claim 1, wherein at least a portion of the housing comprises thermoplastic polyurethane.

4. The device of claim 1, further comprising a sensor, wherein data collected by the sensor controls at least one operating mode of the device.

5. The device of claim 4, wherein the sensor is configured to detect light, sound, motion, moisture, or a combination thereof.

6. The device of claim 1, wherein the microprocessor is configured to control a plurality of operating modes of the LEDs, the plurality of operating modes includes changing the intensity of light emitted from the housing by adjusting an intensity of at least a portion of the LEDs to simulate flickering light.

7. The device of claim 1, further comprising a display coupled to the battery for indicating an amount of power remaining in the battery.

8. The device of claim 1, further comprising a flexible handle coupled to an outer surface of at least one of the first wall or the second wall, wherein the handle includes a removable connection.

9. The device of claim 8, wherein the handle is attached to and movable relative to the electronics wall, the handle being configured to extend outwardly from the electronics wall when in a first position and positioned against the electronics wall when in a second position.

10. The device of claim 1, wherein the plurality of LEDs are configured to emit at least eight different colors of visible light, one of the colors of light being white light.

11. The device of claim 1, wherein the rechargeable battery is a lithium-ion polymer battery having a capacity of up to about 2000 mAh.

12. The device of claim 1, further comprising a flexible handle coupled to the outside surface of the electronics wall, the handle including a first end and a second end each coupled to a portion of the outside surface adjacent to the at least one solar panel, such that a middle portion of the handle between the first and second ends curves above the electronics wall.

13. The device of claim 12, wherein the flexible handle is fixedly attached to the housing.

14. The device of claim 1, wherein the housing is watertight.

15. The device of claim 1, wherein the electronics wall is rigid and comprises a plastic material.

16. The device of claim 1, further comprising a transistor to control the current delivered to the plurality of LEDs.

17. The device of claim 1, wherein the side walls of the housing are translucent.

18. The device of claim 1, wherein the USB connector is a micro-USB connector.

19. The device of claim 1, wherein the operating mode includes changing a wavelength of light emitted from the housing such that a first selection of the interface causes the plurality of LEDs to emit a first color of light, a second selection of the interface causes the plurality of LEDs to emit a second color of light, a third selection of the interface causes the plurality of LEDs to emit a third color of light, a fourth selection of the interface causes the plurality of LEDs to emit a fourth color of light, a fifth selection of the interface causes the plurality of LEDs to emit a fifth color of light, a sixth selection of the interface causes the plurality of LEDs to emit a sixth color of light, and an nth selection of the interface causes the plurality of LEDs to initiate a sequence, the sequence causing the plurality of LEDs to gradually cycle between different colors.

20. The device of claim 1, wherein the housing is cylindrical.

21. The device of claim 1, wherein the housing includes a spring-load mechanism to expand and collapse the housing.

22. An expandable solar-powered lighting device comprising:
- a housing including a first wall, a second wall opposite the first wall, and one or more side walls extending between the first wall and the second wall, the one or more side walls including a plurality of folds extending along a width of the housing, wherein the first wall, second wall, and one or more side walls define an airtight, watertight, or airtight and watertight housing, wherein the housing is configured to collapse the one or more side walls along the plurality of folds;
- at least one solar panel integrated into at least one of the first wall or the second wall;
- a plurality of at least six light-emitting diodes (LEDs) integrated into at least one of the first wall and the second wall, the plurality of LEDs facing an interior of the housing defined by the first wall, second wall, and one or more side walls;
- a rechargeable battery integrated into the at least one of the first wall or the second wall, the rechargeable battery being electrically connected between the at least one solar panel and the plurality of LEDs, such that the rechargeable battery is configured to supply current generated by the at least one solar panel to the plurality of LEDs;
- an electronic connector in communication with the rechargeable battery and the solar panel, the electronic connector being configured to transfer power from at least one of the rechargeable battery or the solar panel to an external electronic device;
- a moveable cover coupled to the first wall or the second wall adjacent to the at least one solar panel and covering the electronic connector, wherein the movable cover provides a removable seal with the at least one of the first wall or the second wall;
- an interface integrated into one or more of the first wall or the second wall that includes the at least one solar panel to enable control of an operating mode of the plurality of LEDs;
- a microprocessor integrated into the at least one of the first wall and the second wall and electrically connected to the interface, the battery, and the plurality of LEDs; and
- a current regulator operably coupled to the rechargeable battery and the microprocessor, the current regulator regulating current delivered to the plurality of LEDs as controlled by the microprocessor;
- wherein the microprocessor is configured to control a plurality of operating modes of the LEDs via input from the interface.

23. The device of claim 22, wherein the electronic connector is a USB-A connector, a USB-B connector, a micro-USB connector, or a Lightning connector.

24. A collapsible solar-powered lighting device comprising:
- a housing including a first wall, a second wall opposite the first wall, and one or more side walls extending between the first wall and the second wall, the one or more side walls being configured to collapse the housing along one or more folded portions between the first wall and the second wall;
- a solar panel integrated into the first wall or the second wall, the solar panel defining the first wall or the second wall as an electronics wall of the housing, wherein the electronics wall includes a moveable cover;
- a plurality of light-emitting diodes (LEDs) integrated into the electronics wall of the housing, the plurality of LEDs facing an interior of the housing;
- a rechargeable battery integrated into the electronics wall of the housing, the rechargeable battery being electrically connected to the solar panel and the plurality of LEDs, such that the rechargeable battery is configured to supply current generated by the solar panel to the plurality of LEDs;
- a universal serial bus (USB) connector in communication with the rechargeable battery and the solar panel, the USB connector being configured to transfer power from at least one of the rechargeable battery or the solar panel to an external electronic device, wherein the USB connector is covered by the movable cover;
- an interface controllable by a user to control an operating mode of the plurality of LEDs; and
- a microprocessor integrated into the electronics wall of the housing, the microprocessor being electrically connected to the interface, the battery, and the plurality of LEDs.

* * * * *